(12) United States Patent
Nonomiya

(10) Patent No.: US 8,371,655 B2
(45) Date of Patent: Feb. 12, 2013

(54) SEAT CUSHION FRAME STRUCTURE OF SEAT FOR VEHICLE AND SEAT FOR VEHICLE WITH SEAT CUSHION FRAME STRUCTURE

(75) Inventor: Masaaki Nonomiya, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 435 days.

(21) Appl. No.: 12/587,648

(22) Filed: Oct. 9, 2009

(65) Prior Publication Data
US 2010/0096895 A1    Apr. 22, 2010

(30) Foreign Application Priority Data

Oct. 20, 2008  (JP) .................................. 2008-270063
Jul. 17, 2009  (JP) .................................. 2009-168356

(51) Int. Cl.
*A47C 7/02*    (2006.01)

(52) U.S. Cl. .......... 297/452.18; 297/216.14; 297/216.15

(58) Field of Classification Search ............. 297/452.18, 297/216.1, 216.14, 216.15, 216.18
See application file for complete search history.

(56) References Cited

U.S. PATENT DOCUMENTS

| 5,839,782 | A * | 11/1998 | Kashiwamura et al. ...... 297/337 |
| 7,137,669 | B2 * | 11/2006 | Nagayama ............... 297/452.49 |
| 7,303,229 | B2 * | 12/2007 | Fujita et al. ............. 297/216.14 |
| 7,681,948 | B2 * | 3/2010 | Fushikida et al. ......... 297/216.1 |
| 2004/0232743 | A1 * | 11/2004 | Fujita et al. ................ 297/216.1 |

FOREIGN PATENT DOCUMENTS

| DE | 10 2007 062 361 A1 | 6/2009 |
| JP | 10-258663 | 9/1998 |
| JP | 2000-142197 | 5/2000 |
| JP | 2006-341663 | 12/2006 |
| JP | 2008-67722 | 3/2008 |

* cited by examiner

*Primary Examiner* — Peter Brown
*Assistant Examiner* — Erika Garrett
(74) *Attorney, Agent, or Firm* — Flynn, Thiel, Boutell & Tanis, P.C.

(57) ABSTRACT

A seat cushion frame structure of a seat for a vehicle has a seat cushion frame structure, a rear end of which is connected to a lower end of a seat back frame structure in such a way that the seat back frame structure can be inclined relative to the seat cushion frame structure, the seat cushion frame structure includes a pair of side frames, each of which extends in a longitudinal direction of the vehicle, and an oblique wire on at least one of the pair of side frames, an upper end of which is fixed to a side portion of the at least one of pair of side frames and a lower end of which is fixed to the seat cushion frame structure at a position forward of the upper end.

10 Claims, 27 Drawing Sheets

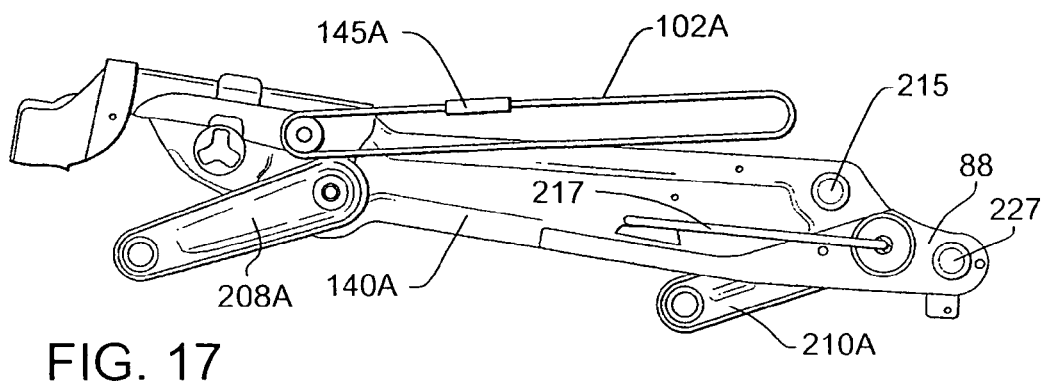
FIG. 17
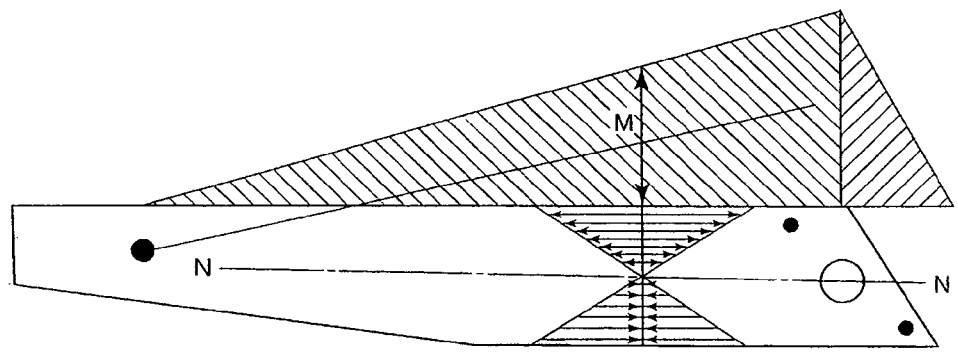
FIG. 17A     +
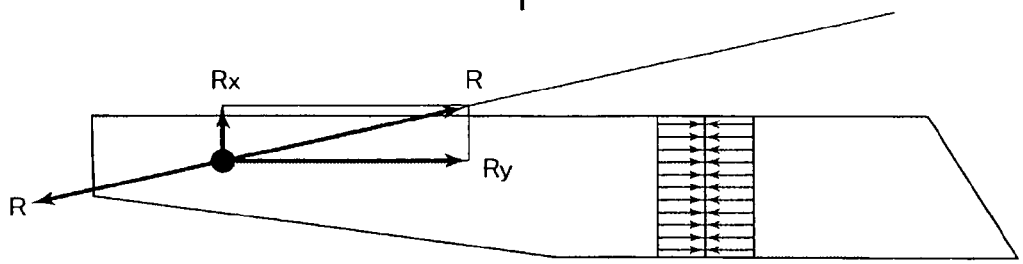
FIG. 17B     =
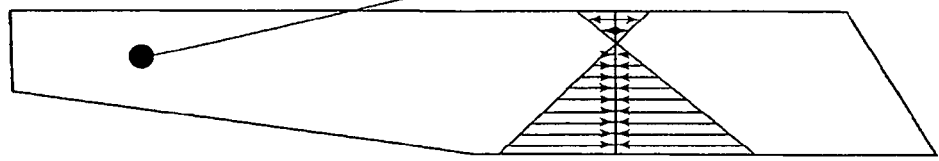
FIG. 17C

| CROSS SECTIONAL SHAPE | CROSS SECTIONAL AREA (mm²) | MOMENT OF INERTIA OF AREA (mm⁴) | MINIMUM MOMENT OF INERTIA OF AREA (mm⁴) | MINIMUM RADIUS OF GYRATION OF AREA (mm) | |
|---|---|---|---|---|---|
| 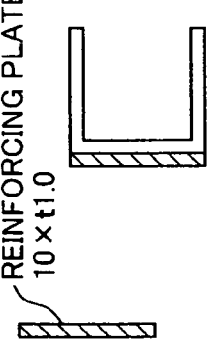 REINFORCING PLATE 10 × t1.0 | A=38 | $I_y=533$ <br> $I_z=418$ | $I=418$ | $k=3.31$ | PROPOSAL 1 |
|  | A=38 | $I_y=673$ <br> $I_z=379$ | $I=379$ | $k=3.16$ | PROPOSAL 2 |
|  | A=38 | $I_y=533$ <br> $I_z=623$ | $I=533$ | $k=3.75$ | PROPOSAL 3 |
FIG. 27

SEAT CUSHION FRAME STRUCTURE OF SEAT FOR VEHICLE AND SEAT FOR VEHICLE WITH SEAT CUSHION FRAME STRUCTURE

FIELD OF THE INVENTION

The present invention relates to a seat cushion frame structure of a seat for a vehicle and a seat for a vehicle with said seat cushion frame structure, and, in particular, relates to such a seat cushion frame structure of a seat for a vehicle and a seat for a vehicle with said seat cushion frame structure which are capable of decreasing the cost and weight of a seat, while at the same time securing a necessary strength or rigidity.

BACKGROUND OF THE INVENTION

Conventionally, a seat back frame structure of a seat for a vehicle which is capable of reducing an impact load acting on a passenger has been adopted. The Japanese Patent Laid-open Publication HEI11-32865, for instance, discloses one example of such a seat back frame structure.

This seat back frame structure for a vehicle comprises a seat back frame structure integrally formed into a substantially C-shape, a tubular body connecting right and left longitudinal frames of the seat back frame structure, and a flattened tubular portion which is provided on this tubular body and is flattened so as to be bent due to the impact load acting on a passenger upon a rear collision of the vehicle.

According to the above seat back frame structure, a closed cross sectional structure (a box structure) is formed by connecting the right and left longitudinal frames in the widthwise direction through said tubular body and thus, a safety of a passenger upon the collision can be secured due to the fact that said flattened tubular portion functions as an energy absorbing portion which substantially restricts a destruction caused by the bending of the longitudinal frames upon the collision.

However, said conventional seat back frame structure has caused the following technical problems.

The strength or the rigidity of the seat back frame structure can be improved by the closed sectional structure (a box structure) of the seat back frame structure and the provision of the energy absorbing portion, however, the increase of the weight of the seat back frame structure is caused. This is contrary to a recent movement of a decrease of an amount of carbon dioxide emission by a decrease of an amount of the fuel being used.

In this connection, in order to limit such an increase of the weight, an example of adopting a high strength steel member such as an ultra high tension steel plate is disclosed in Japanese Patent Laid-open Publication 2008-67722. More specifically, left and right side frames with predetermined shapes into which the ultra high tension steel plate is formed by a press working is adopted.

However, such a high strength member is so expensive that the seat for a vehicle costs more, even if the increase of the weight can be restricted.

The seat back includes such a seat back frame structure which is mounted on the seat cushion so as to be inclined relative to the seat cushion, and a recliner is provided between the seat back frame structure and the seat cushion frame structure, so that in a case where the recliner is set to a locking situation, a bending moment acts on the seat cushion through the recliner when an impact load is exerted on the seat back. The seat cushion frame structure, like the seat back frame structure, includes a pair of side frames, each of which extends in the longitudinal direction of the vehicle, and each of the pair of side frames includes a C-shaped cross section so as to secure a section modulus in order to withstand such a bending moment.

However, like the seat back frame structure, in order to secure the strength or the rigidity, the weight of the seat cushion frame structure is inevitably increased, and its cost is also increased if the high tension member is adopted.

SUMMARY OF THE INVENTION

In view of the above technical problems, an object of the present invention is to provide a seat cushion frame structure of a seat for a vehicle and a seat for a vehicle with such a seat cushion frame structure which are capable of securing a necessary strength or rigidity, while at the same time attaining a decrease in the weight and cost of a seat.

In view of the above technical problems, according to an aspect of the invention, there is provided a seat cushion frame structure of a seat for a vehicle comprising a seat cushion frame structure, a rear end of which is connected to a lower end of a seat back frame structure in such a way that the seat back frame structure can be inclined relative to the seat cushion frame structure, said seat cushion frame structure includes a pair of side frames, each of which extends in a longitudinal direction of the vehicle, and an oblique wire on at least one of said pair of side frames, an upper end of which is fixed to a side portion of said at least one of pair of side frames and a lower end of which is fixed to said seat cushion frame structure at a position forward of said upper end, said oblique wire including the characteristics in such a way that, in a case where a load toward a rear side of the vehicle is loaded on said seat cushion frame structure, it has a tension force exerted on said seat cushion frame structure so as to alleviate a moment acting on said seat cushion frame structure caused by said load, while it does not resist a compressive force from the outside thereof.

According to the seat cushion frame structure of a seat for a vehicle of the present invention, based on the fact that, with respect to a supposed impact load loaded on a seat back frame structure, the impact load toward the rear side of the vehicle is set to be higher than that toward the front side of the vehicle, a sectional shape of at least one of a pair of side frames can be determined so as to set a section modulus of at least one of the pair of side frames in such a way that at least one of the pair of side frames can withstand a bending moment caused by the impact load loaded toward the front side of the vehicle, and in a case where the impact load is loaded toward the rear side of the vehicle, when such an impact load is transmitted to the seat cushion frame structure through a connection portion between the seat cushion and the seat back, it is possible to cause an oblique wire to share a difference between said impact load toward the front side of the vehicle and that toward the rear side of the vehicle by positioning the oblique wire so as to cause a tension force from the oblique wire to be exerted on the seat cushion frame structure in such a way that said bending moment acting on the seat cushion frame structure based on said impact load toward the rear side of the vehicle can be alleviated.

On the other hand, since the oblique wire includes a characteristic so as not to resist a compressive force from the outside thereof, the structural integrity of the oblique wire itself can be maintained due to the fact that it does not function as a strength member in a case where the impact load toward the front side of the vehicle is loaded.

Since it becomes unnecessary to set a sectional shape of the pair of side frames so as to withstand the impact load toward the rear side of the vehicle, a necessary strength or rigidity can be secured, while at the same time the weight of the pair of side frames can be decreased by means of the oblique wire.

In another embodiment of the present invention, a pulley is provided on said at least one of the pair of side frames and another pulley is provided on the seat cushion frame structure, said oblique wire is in an endless form to be wound around said two pulleys.

In another embodiment of the present invention, said oblique wire is provided with a means for adjusting a length of said oblique wire.

In another embodiment of the present invention, said means of adjusting a length of said oblique wire comprises a bolt-nut mechanism, whereby the length of said oblique wire is adjusted by adjusting an amount by which the bolt is threaded into the nut.

In another embodiment of the present invention, a recliner is provided between said seat cushion frame structure and said seat back frame structure so as to allow the seat back incline relative to the seat cushion, said recliner comprises a base member fixed to said seat cushion, a rotational arm rotatably supported by said base member and fixed to the seat back, a sliding lock member which is interposed between said base member and said rotational arm and is guided by a concave side wall formed on said base member and forms outer teeth at its tip portion, a rotational cam which moves said sliding lock member between a locking position where said sliding lock member mates with inner teeth formed on said rotational arm and a disengaging position where said sliding lock member disengages the inner teeth, and an actuation lever which rotates said rotational cam, said rotational arm comprises an annular ring with a predetermined thickness including a circular opening inside, said inner teeth are provided along an inner peripheral surface of said annular ring and a plurality of mounting brackets to be fixed on said seat back are provided on an outer peripheral surface of said annular ring, said seat cushion frame structure further comprises a closure plate which closes said circular opening from a side opposite to said base member, a thickness of said closure plate is thinner than that of said annular ring, said base member is a circular plate with a predetermined thickness provided on a central portion of said base member and including a bracket portion with a perforated hole into which a pivot shaft of said actuation lever penetrates, said seat cushion frame structure further includes a base member bracket, a thickness of which is thinner than that of said base member at a side opposite to said rotational arm, said base member bracket is provided with a mounting portion for fixing said base member bracket to the seat cushion, the upper end of said oblique wire is fixed on said mounting portion.

In another embodiment of the present invention, said oblique wire is provided on each of the side portions of the pair of side frames.

In another embodiment of the present invention, said oblique wire is made of metal.

In another embodiment of the present invention, said oblique wire is made of CFRP.

In another embodiment of the present invention, said oblique wire is provided in such a way that a line between the lower end of said oblique wire and a rotational center of said seat back is perpendicular to a line between the upper end of said oblique wire and a rotational center of said seat back.

In another embodiment of the present invention, said oblique wire is a single wire at each end of which a fixing ring is provided.

In another embodiment of the present invention, each of said pair of side frames comprises a main side portion with a width in the vertical direction and two flange portions inwardly protruding from the upper and lower edges of the main side portion, respectively, to form a C-shaped cross section inwardly oriented, the width of the main side portion is substantially constant in the longitudinal direction of the vehicle.

In another embodiment of the present invention, a reinforcing bracket which extends in the longitudinal direction of the vehicle around an edge portion of the lower side of the vehicle and tapers in such a way that its width in the vertical direction is increased as a longitudinal position approaches the rear end of the vehicle and includes a flange on its upper and lower edges, respectively, is provided on at least one of said pair of side frames on which said oblique wire is provided.

In another embodiment of the present invention, each of said pair of side frames includes a cross sectional shape in which a C-shaped cross section extending in the longitudinal direction of the vehicle around an edge portion on a lower side of the vehicle and a C-shaped cross section extending in the longitudinal direction of the vehicle around an edge portion of an upper side of the vehicle are combined, said reinforcing bracket is provided so as to form a closed cross sectional structure closing an opened portion of said C-shaped cross section around the edge portion of the lower side of the vehicle.

In another embodiment of the present invention, each of said pair of side frames includes a C-shaped cross section extending in the longitudinal direction of the vehicle around an edge portion on a lower side of the vehicle, said reinforcing bracket is provided so as to form a closed cross sectional structure closing an opened portion of said C-shaped cross section.

In another embodiment of the present invention, said closed cross sectional structure is shaped to be substantially square.

In another embodiment of the present invention, a width in the vertical direction of the vehicle of said closed cross sectional structure is no wider than a distance between a neutral axis with respect said bending moment caused by said oblique wire and the edge portion of the lower side of the vehicle.

In another embodiment of the present invention, the width of the closed cross sectional structure in the direction perpendicular to the vertical direction of the vehicle is determined by a required section modulus of said pair of side frames with respect to the bending moment about the vertical direction.

In another embodiment of the present invention, said seat cushion frame structure includes a lifter mechanism for upwardly and downwardly moving the seat for a vehicle, the lifter mechanism comprises a front pipe connecting front portions of said pair of side frames and extending in the widthwise direction of the vehicle perpendicular to the longitudinal direction, and a rear pipe connecting rear portions of said pair of side frames and extending in the widthwise direction of the vehicle, said front pipe is supported by the front portion of each of said pair of side frames so as to be pivoted about the widthwise direction of the vehicle, while said rear pipe is supported by the rear portion of each of said pair of side frames so as to be pivoted about the widthwise direction of the vehicle, said seat cushion frame structure further includes a parallel link mechanism connecting between the lower surface of the vehicle and the seat cushion, said parallel link mechanism includes a pair of front links one end of each of which is supported by the lower surface of the vehicle so as to be pivoted about the widthwise direction, while the other end of each of which is supported by said front pipe so as to be pivoted about the widthwise direction, and a pair of rear links, one end of each of which is supported by the lower surface of the vehicle so as to be pivoted about the widthwise direction, while the other end of each of which is supported by said rear pipe so as to be pivoted about the widthwise direction, each of said pair of side frames includes a first perforated hole into which said rear pipe penetrates, said reinforcing bracket includes a second perforated hole into which said rear pipe penetrates, said second perforated hole is provided on an inner surface of the corresponding side frame so as to align with said first perforated hole, and said reinforcing bracket includes a maximum width in the vertical direction at the longitudinal position where said second perforated hole is provided.

According to an aspect of the present invention, there is provided a seat for a vehicle comprising a pad to cover the entirety of said seat cushion frame structure, and a skin sheet in a bag form to cover the entire of said seat cushion frame structure and said pad.

According to the seat for the vehicle of the present invention, in a case where the seat for the vehicle is completed by mounting a pad on the above frame structure of the seat for the vehicle, the embedding of the oblique wire into the pad can prevent a visual appearance of the seat for the vehicle from being deteriorated.

BRIEF DESCRIPTION OF THE DRAWINGS

FIG. 17 is a general view showing a stress generated on a side frame of a frame structure of a seat cushion in a resolved manner in a case where an impact load toward the rear side of the vehicle is loaded on a frame structure of a seat cushion of a seat for a vehicle on, which the oblique wire is mounted.

FIG. 27 is a table showing the most effective way of the reinforcing of the side frame for securing its weight efficiency while at the same time preventing its buckling.

DETAILED DESCRIPTION OF EMBODIMENTS OF THE INVENTION

The embodiment of the present invention in which the seat for the vehicle is applied to a front seat of an automobile will be described in detail with reference to the drawings as an example.

Figure 1:
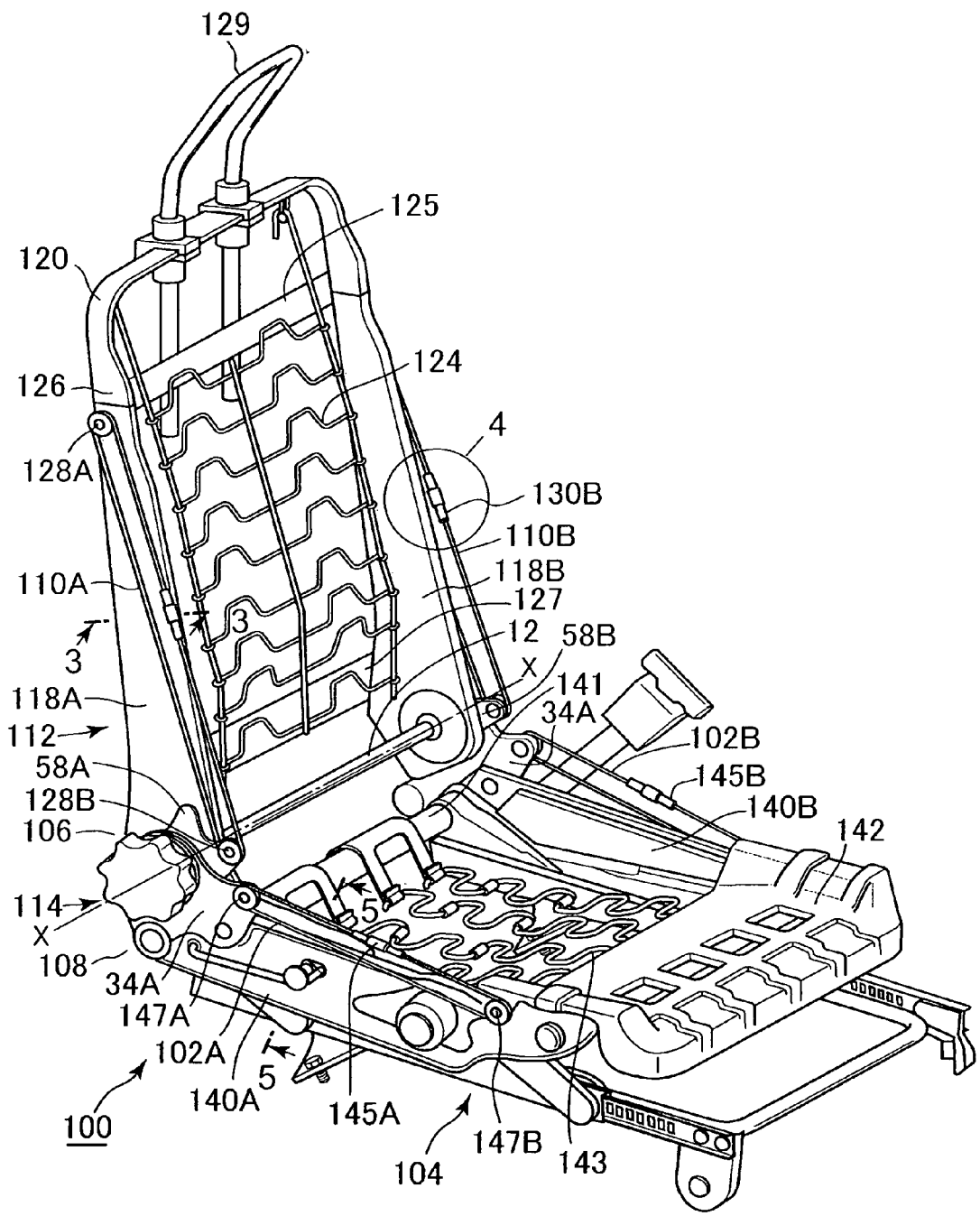
FIG. 1 is a perspective view showing a seat for a vehicle in a first embodiment of the present invention.
Figure 2:
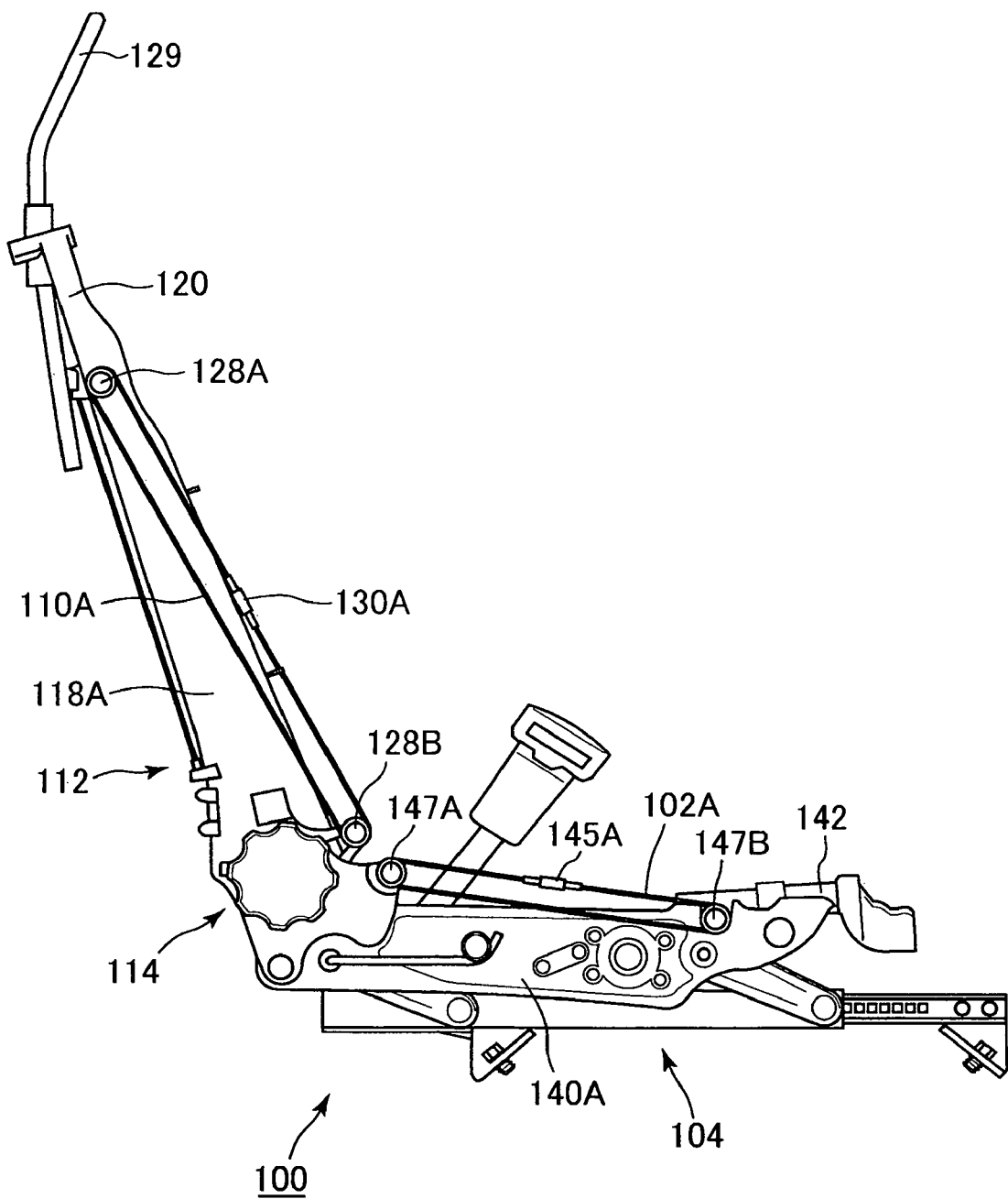
FIG. 2 is a side view showing a seat for a vehicle in the first embodiment of the present invention.

As shown in FIGS. 1 and 2, a seat 100 for a vehicle of the present invention comprises a seat cushion frame structure 104 portion 104 which is fixed on a floor of a vehicle compartment and includes oblique wires 102A,B described hereinafter, a seat back frame structure 112 portion 112 a lower end portion 106 of which is connected to a rear end portion 108 of the seat cushion frame structure 104 portion 104 so as to be inclined relative thereto and which includes oblique wires 110A,B described hereinafter, a recliner structure portion 114 interposed between the seat cushion frame structure 104 portion 104 and the seat back frame structure 112 portion 112, a pad (not shown) so as to cover the entire seat frame structure for the vehicle, and a skin sheet (not shown) so as to cover the entire seat frame structure and the pad. In FIG. 1, a rotational axis X-X is shown. In FIGS. 1 and 2, the forward direction of the vehicle corresponds to the right direction in the drawings.

Explaining about the seat back frame structure 112 portion 112, the seat back frame structure 112 portion 112 is shaped to be a reversed U as a whole and includes a pair of side frames 118A,B, each of which extends in the vertical direction, and an upper frame 120 which connects the upper portions of the pair of side frames 118A,B.

Figure 3:
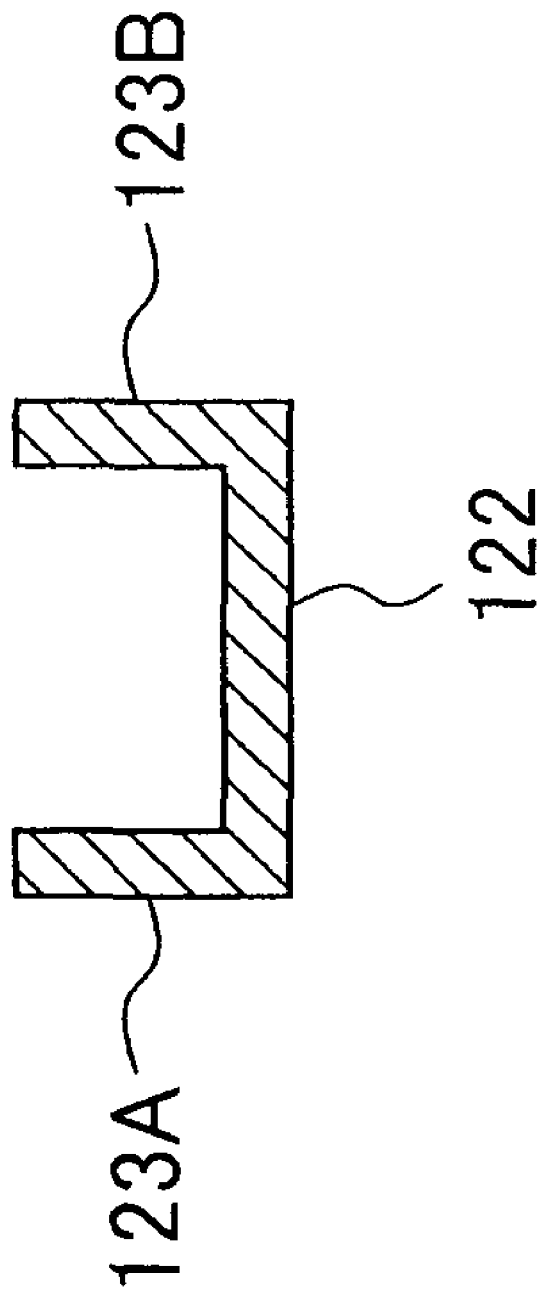
FIG. 3 is a cross sectional view taken along a line A-A in FIG. 1.

As shown in FIG. 3, each of the pair side frames 118A,B includes a main side face portion 122 with a width in the longitudinal direction of the vehicle mainly defining an external shape and protruding flange portions 123A,B inwardly protruding from the front and the rear edges of the main side face portion 122, respectively, to form a C-shaped cross section inwardly oriented.

A flat mat 124 is provided on an opening formed inside of the reversed U-shaped seat back frame structure 112 112, and an upper member 125 connecting the upper portions of the pair of side frames 118A,B and a lower member 127 connecting the lower portions of the pair of side frames 118A,B are provided. In addition, a member 129 on which a head rest (not shown) is mounted is provided on the upper frame 120. Both lower end portions of the upper frame 120 is shaped to be a C-shaped cross section, like the pair of side frames 118A,B, whereby each lower end is fitted to the corresponding upper portion of the pair of the side frames 118A,B.

Explaining about the oblique wires 110A,B, the oblique wires 110A,B are mounted on the main side portions 122 of the pair of side frames 118A,B, respectively. Since the oblique wires 110A,B have the same structure, one of the oblique wires 110A,B will be described below.

An upper end of the oblique wire 110A is fixed on a side portion of the side frame 118A, while a lower end thereof is fixed on the seat back frame structure 112 112 at a position located to be forward of a rotational center of the seat back frame structure 112 112, so that the oblique wire 110 is obliquely mounted. An oblique angle may be appropriately set in accordance with a supposed impact load, etc.

More specifically, the upper end of the oblique wire 110A is mounted on an overlapping portion 126 between an upper end of the side frame 118A and the upper frame 120, while the lower end thereof is mounted on a bracket portion 58 of the recliner structure portion 114 described below. This allows for the upper end of the oblique wire 110A to be mounted on a portion structurally reinforced, while this allow for the lower end thereof to be positioned utilizing the bracket portion of the recliner structure portion 114.

In particular, it is preferable to position the oblique wire 110A so as to set an angle between a line connecting the upper end of the oblique wire 110A and the rotational center of the seat back frame structure 112 112 and a line connecting the lower end of the oblique wire 110A and the rotational center of the seat back frame structure 112 to be 90 degree.

Pulleys 128A,B are mounted on the main side portion 122 of the side frame 118A and on the bracket portion 58, respectively, and the oblique wire 110A is formed to be endless to be wound around two pulleys 128A,B.

The kind and the material of the oblique wire may be any so long as, in a case where the impact load is loaded on the seat for the vehicle 100 upon the collision of the vehicle, for instance, a strength or rigidity of the oblique wire sufficient to share a portion of such a load, while at the same time to secure its structural integrity is obtained. It is preferable that the oblique wire be made of either metal or CFRP.

Figure 4:
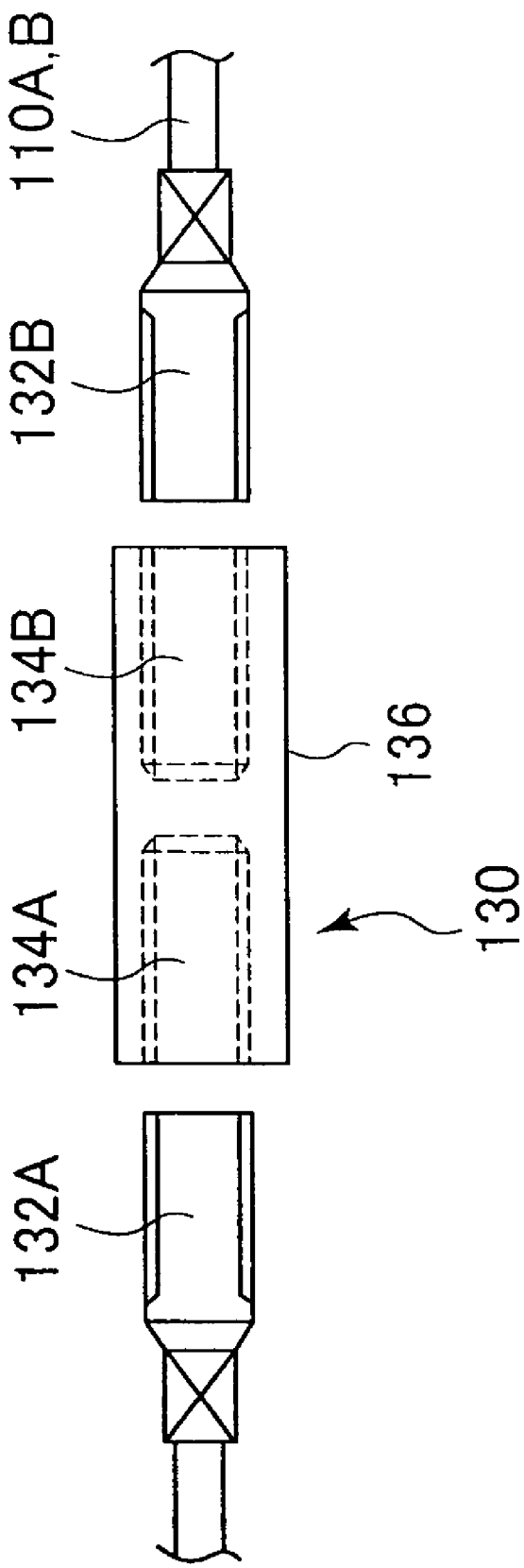
FIG. 4 is a detail view showing A portion in FIG. 1.

As shown in FIG. 4, a bolt-nut mechanism 130 for adjusting a length of the oblique wire is mounted on the oblique wire 110A. More specifically, bolts 132A,B with external threads are mounted on ends of the oblique wire 110A, respectively, while a nut 136 including bores 134A,B on each of which internal threads extending inwardly from the corresponding end is provided. An amount of the threading is adjusted by having each of the bolts 132 thread into the corresponding bore 134, whereby an entire length of the wire can be adjusted while the oblique wire 110A is kept wound around the pulleys 128A,B. This allows for the length of the wire to be adjusted at two points by utilizing two bolts 132A, B.

In such a case, the length of the wire may be adjusted in such a way that no tension force is generated on the oblique wire 110A, while the wire does not become loose under a normal situation in which no load is loaded on the seat for the vehicle, or it may be adjusted so as to generate the tension force on the oblique wire 110A. Alternatively, the length of the wire may be adjusted by providing the bolt 132 and the nut 136 on one end of the oblique wire and the other end thereof, respectively, to adjust the amount of the threading of one bolt 132 into one nut 136.

Such being the case, the bolt-nut mechanism 130 for adjusting the length of the wire can be unified at each side of the side frames 118, even though the above structure corresponds to the situation in which two oblique wires are substantially provided on each side by winding the endless wire around pulleys 128A,B.

In this connection, such an adjustment of the length of the oblique wire 110A has to be carried out before an urethane pad is applied to the entire seat back frame structure 112.

By the oblique wire 110A, in a case where the impact load toward the rear side of the vehicle upon the collision of the vehicle, for instance, is loaded on the seat back frame structure 112 112, a tension force can exert on the seat back frame structure 112 112 due to said impact load, while the wire does not resist a compressive force from outside caused by the impact load toward the front side of the vehicle.

As shown in FIGS. 1 and 2, the seat cushion frame structure 104 104 will be now described. The seat cushion frame structure 104 104 generally comprises a pair of side frames 140A,B each of which extends in the longitudinal direction, a rear frame 141 connecting rear end portions 108 of the pair of side frames 140A,B, and a front frame 142 connecting front end portions of the pair of side frames 140A,B, whereby a closed cross sectional structure (a box structure) is formed by these frames. Cushion springs 143 each of which extends in the longitudinal direction between the rear frame 140 and the front frame 142 are provided on an opening of the closed cross sectional structure.

Figure 5:
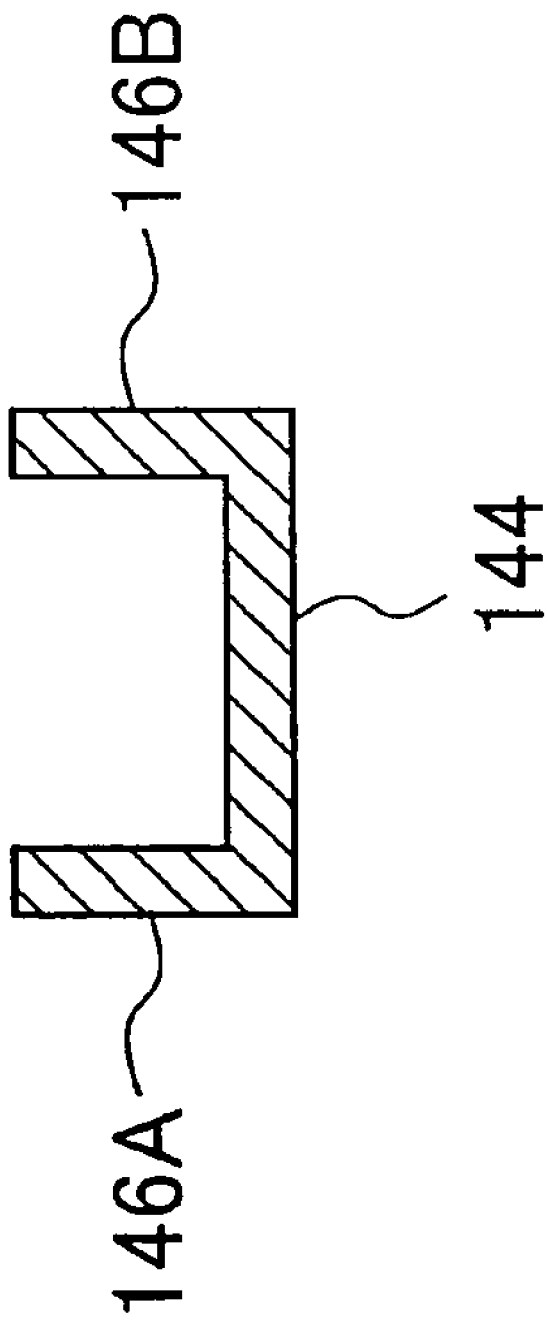
FIG. 5 is a cross sectional view taken along a line B-B in FIG. 1.

As shown in FIG. 5, each of the pair of side frames 140A,B has the same structure as that of the side frames 118 of the seat back frame structure 112 112. More specifically, each of the pair of side frames 140A,B includes a main side portion 144 with a width in the vertical direction constituting an external shape, and protruding flange portions 146A,B inwardly protruding from upper and lower edges of the main side portion 144, respectively, whereby an inwardly oriented C-shaped cross section is formed as a whole.

With respect to the oblique wires 102A,B, the oblique wires 102A,B are mounted on the side portions of the pair of side frames 140A,B, respectively. The oblique wires 102A,B have the same structure, one of the oblique wires 102A,B will be described.

An upper end of the oblique wire 102 A is fixed on the side portion of the side frame 140A, while a lower end thereof is fixed on the seat cushion frame structure 104 at a position forward of the upper end, so that the oblique wire is obliquely fixed. An oblique angle may be appropriately set in accordance with a supposed impact load, etc.

More specifically, the upper end of the oblique wire 102 A is mounted on a bracket 34 of the recliner structure portion 114, while the lower end thereof is mounted on the side portion of the side frame 140A.

Pulleys 147A,B are provided on the side portion of the side frame 140A and on the bracket portion 34, respectively, and the oblique wire 102A is formed to be endless to be wound around the pulleys 147A,B.

The kind and the material of the oblique wire 102A may be any so long as, in a case where the impact load is loaded on the seat for the vehicle 100 upon the collision of the vehicle, for instance, a strength or rigidity of the oblique wire sufficient to share a portion of such a load, while at the same time to secure its structural integrity is obtained. It is preferable that the oblique wire be made of either metal or CFRP.

In this connection, since, like the oblique wires 110A,B provided on the seat back frame structure 112, a means for adjusting the length of the wire 145A,B are provided on the oblique wires 102A,B, respectively, so that the explanation thereabout is omitted.

Figure 6:
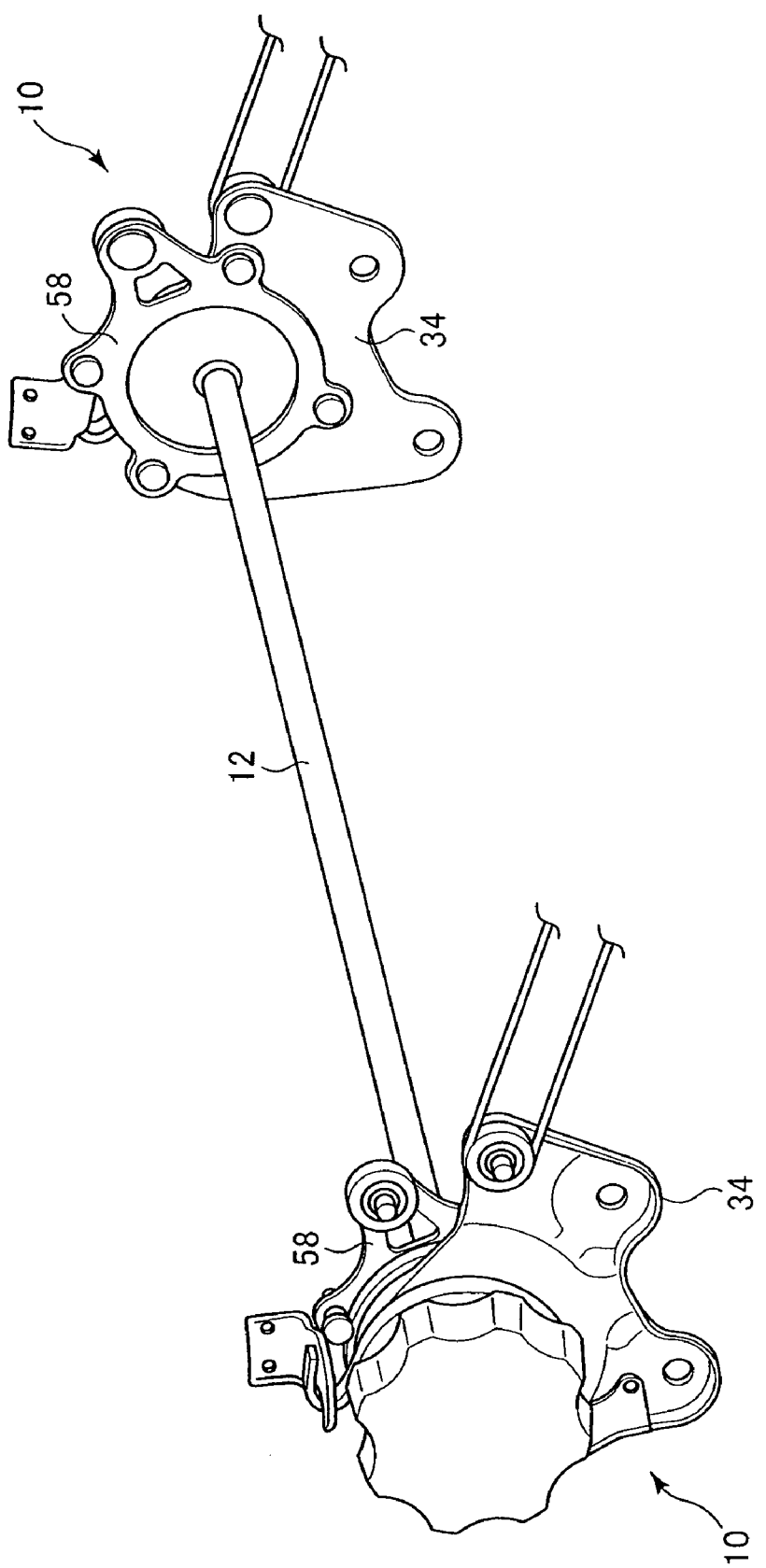
FIG. 6 is a general perspective view showing a recliner of a seat for a vehicle in the first embodiment of the present invention.

Next, explaining about the recliner structure 114, as shown in FIG. 6, the recliners 10 are provided on portions each of which connecting a side surface of the seat cushion frame structure 104 on which a driver or a passenger sits and the corresponding side surface of the seat back frame structure 112 against which a driver or a passenger leans, respectively. A pair of recliners 10 are connected by a connecting shaft 12 extending in the widthwise direction so as to allow for the seat back B to incline relative to the seat cushion C. Since the pair of recliners 10 have the same structure except for the fact that a knob is provided on one of the recliners, one of the recliners will be described below.

Figure 7:
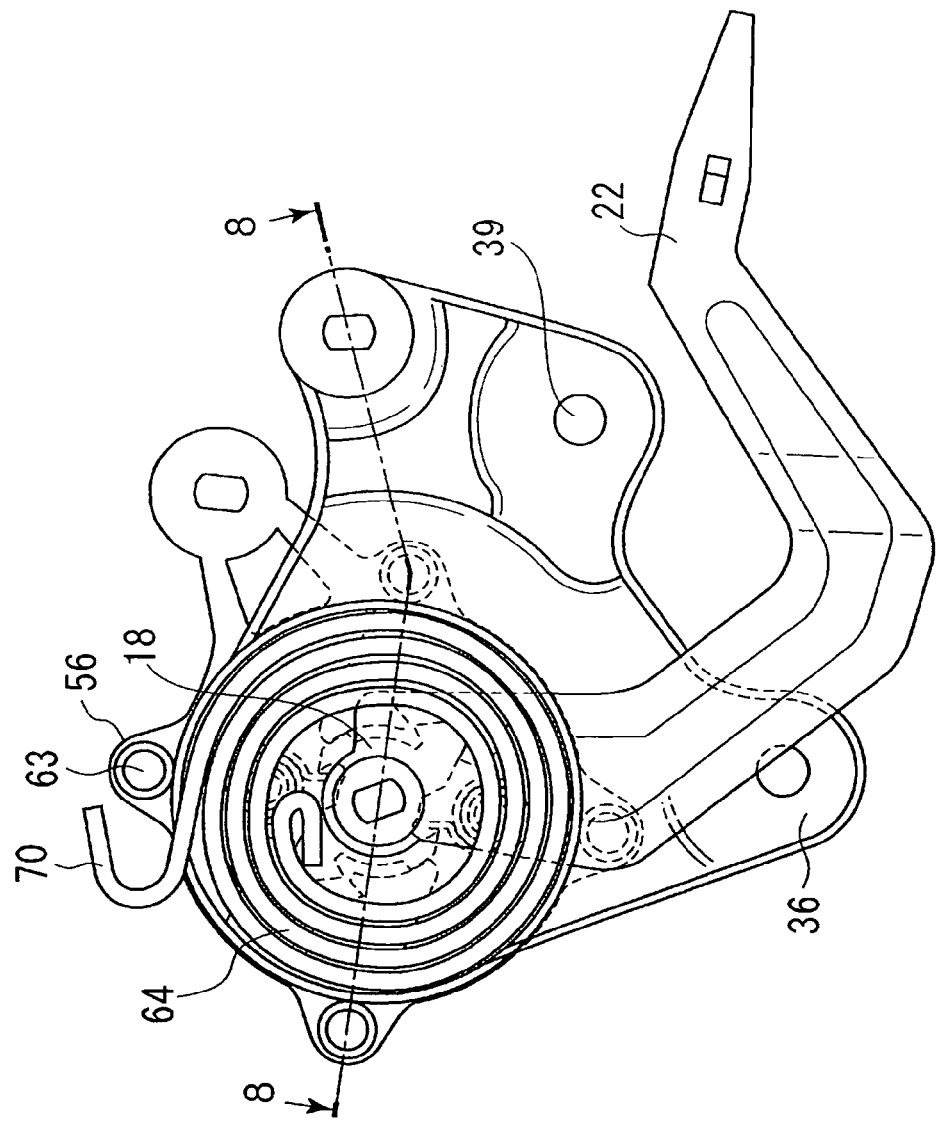
FIG. 7 is a side view showing a recliner of a seat for a vehicle in the first embodiment of the present invention.
Figure 8:
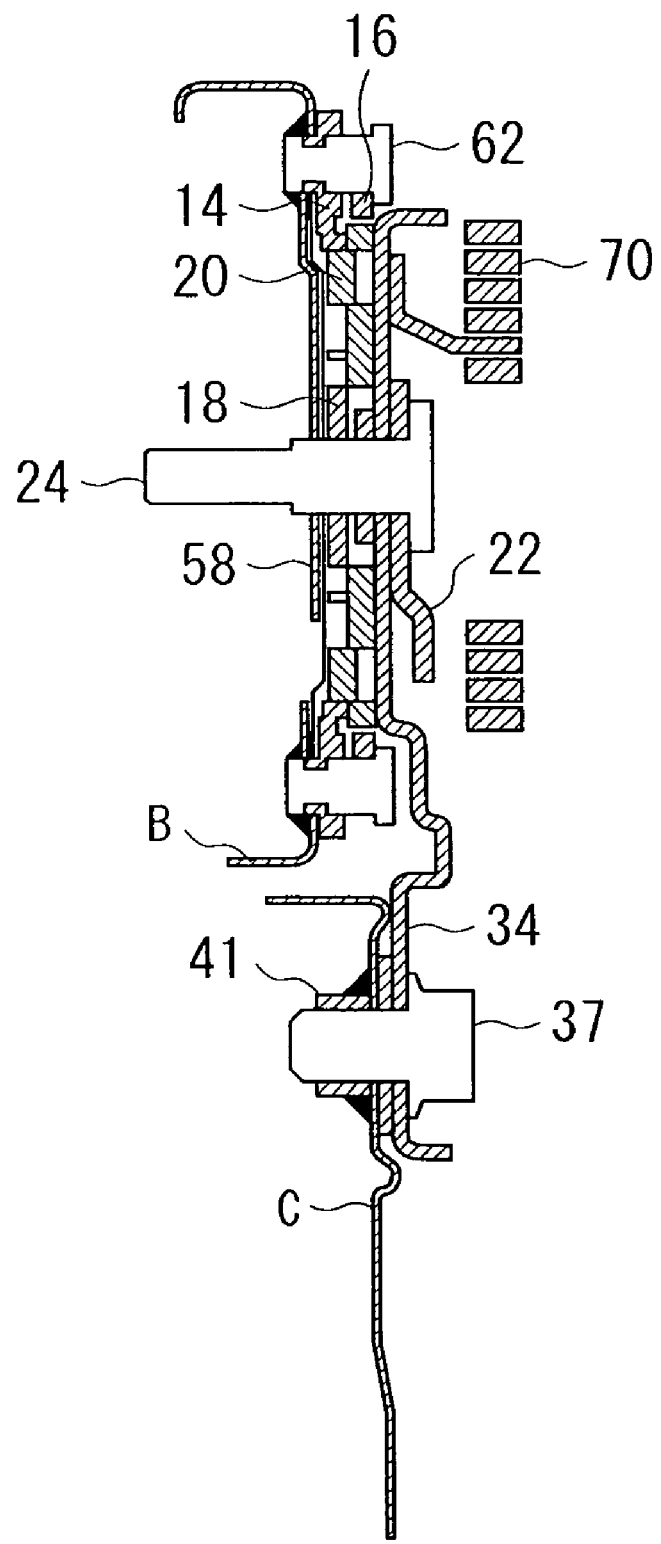
FIG. 8 is a cross sectional view taken along a line A-A in FIG. 7.
Figure 9:
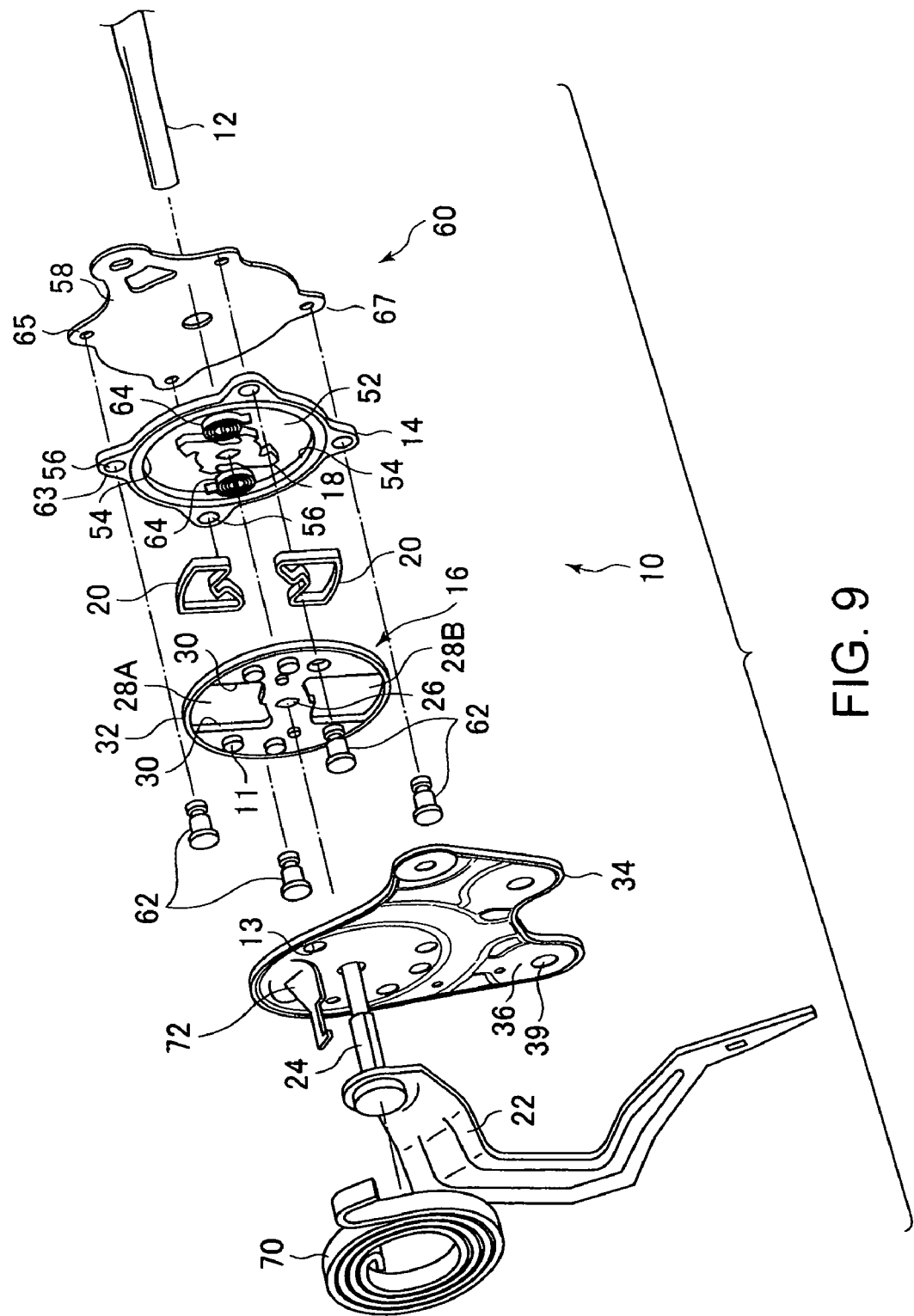
FIG. 9 is a general exploded perspective view showing a recliner of a seat for a vehicle in the first embodiment of the present invention.

As shown in FIGS. 7 to 9, each of the recliners 10 generally comprises a rotational arm 14 mounted on the seat back frame structure 112, a base member 16 mounted on the seat cushion frame structure 104, a cam 18 interposed between the rotational arm 14 and the base member 16, a pair of sliding lock members 20 disposed so as to sandwich the cam 18, and an actuation lever 22 rotating the cam 18. The rotational arm 14 is supported so as to rotate about a pivot shaft 24 fixed on the actuation lever 22.

As shown in FIG. 9, the base member 16 is a circular plate made of metal, and a perforated hole 26 into which the pivot shaft 24 penetrates is formed at its central portion. The size of the perforated hole 26 is such that the base member 16 is not rotated by the rotation of the pivot shaft 24. A pair of openings 28A,B are provided on the base member 16 in such a way that one of the openings extends at one side of the perforated hole 26, while the other of the openings extends at the other side thereof. Each of the pair of openings 28A,B is defined by a pair of right and left guiding side walls 30 and arcuate side walls 32 formed between the lower ends of the right and left guiding side walls 30 and between the upper ends of the right and left guiding side walls 30, respectively. The size of each of the openings 28 is set in such a way that each of the pair of sliding lock members 22 described below can be slid in the radial direction along the right and left guiding side walls 30 within the corresponding opening 28. The diameter of the arcuate side wall 32 is set to be larger than that of a circular opening 52 of the rotational arm 14 described below.

On the side of the base member 16 opposite to the side where the rotational arm 14 is located, a base bracket 34 is provided so as to close the pair of openings 28. A perforated hole 33 into which the pivot shaft 24 penetrates is formed at the central portion of the base bracket 34 and a mounting portion 36 fixed on the seat cushion frame structure 104 is provided on the lower portion of the base bracket 34. Perforated holes 39 are provided on the mounting portion 36. The base bracket 34 and the seat cushion C are fixed to each other by a welding nut 41 by making a bolt 37 penetrate into the perforated hole 39 and the corresponding perforated hole of the seat cushion C (refer to FIG. 8). In addition, as described above, a bracket for providing the pulley for the oblique wire 102 is provided utilizing the base bracket 34.

A plurality of protrusions 11 are provided on one of the surfaces of the base member 16, while openings 13, each of which is shaped to be complementary with the protrusion 11, are provided on a corresponding position of the base bracket 34, so that the base bracket 34 can be fixed on the base member 16 by means of welding, for instance, by fitting each of the protrusions 11 into the corresponding opening 13. In the base member 16, since a load transmitting path is defined between the guiding side walls 30 and the sliding lock members 20, the thickness of the base member 16 is set so as to withstand such a load. For instance, the thickness of the base member 16 is 3.6 mm, while the thickness of the base bracket 34 is set to be thinner than that of the base member 16.

Explaining about the sliding lock members 20, the sliding lock members 20 forms a pair, and each of the pair is disposed within the corresponding opening 28 of the base member 16 so as to be freely moved in the radial direction guided by the right and left guiding side walls 30.

Figure 10A:
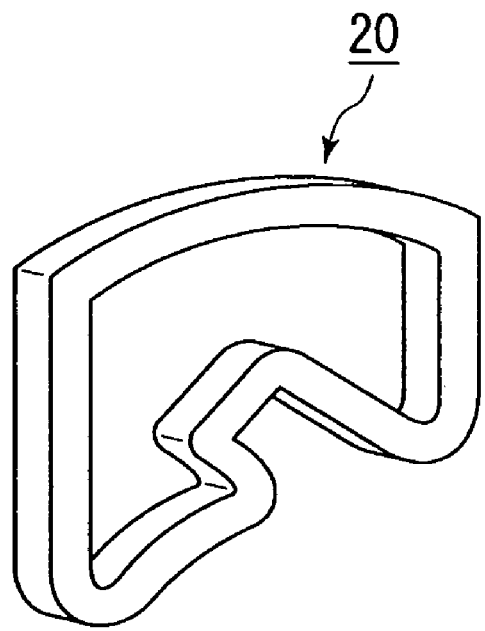
FIG. 10 is a perspective view showing a sliding lock member of a recliner in the first embodiment of the present invention.
Figure 10B:
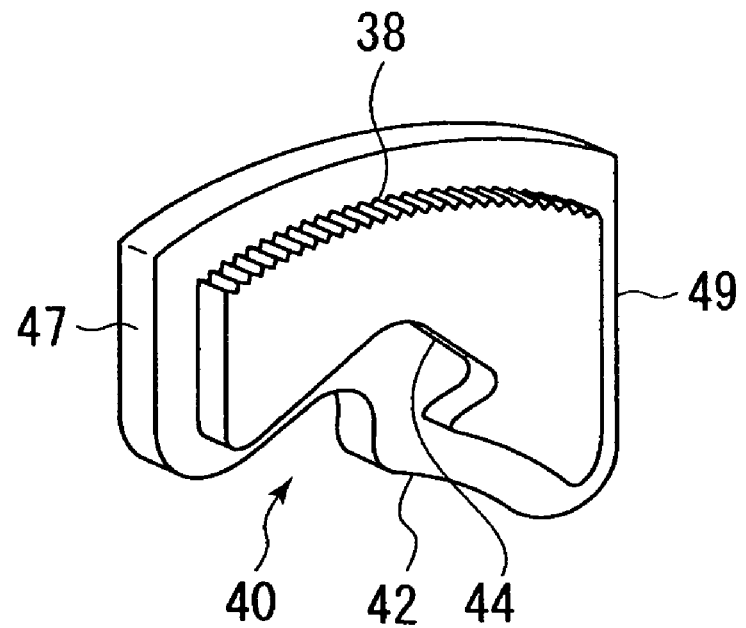

As shown in FIG. 10, in each of the sliding lock members 20, outer teeth 38 are formed on its outer peripheral side, while a cam surface 40 is formed on its inner peripheral side. Further, both side surfaces 47, 49 are formed to be parallel to each other so as to be slid along the guiding side walls 30.

The cam surface 40 comprises a protruding engaging portion 42 inwardly protruding and an engaging concave portion 44 continuously and outwardly extending from the protruding engaging portion 42, and the protruding engaging portion 42 and the engaging concave portion 44 engage the cam 18 described below, whereby each of the sliding lock members 20 is caused to be freely moved in the radial direction between an engaging position where the outer teeth 38 mate with the corresponding inner teeth 54 formed on the rotational arm 14 described below and a release position where the mating of the outer teeth 38 with the corresponding inner teeth 54 is released.

The pair of sliding lock members 20 are disposed within a space formed between the circular opening 52 of the rotational arm 14 and the pair of openings 28 of the base member 16 when the base member 16 and the rotational arm 14 are superimposed so that the outer teeth 38 provided on each of the pair of sliding lock members 20 can mate with the corresponding inner teeth 54 provided on the circular opening 52, while the sliding lock members 20 can be guided by the guiding side walls 30 of the pair of the openings 28.

Figure 11:
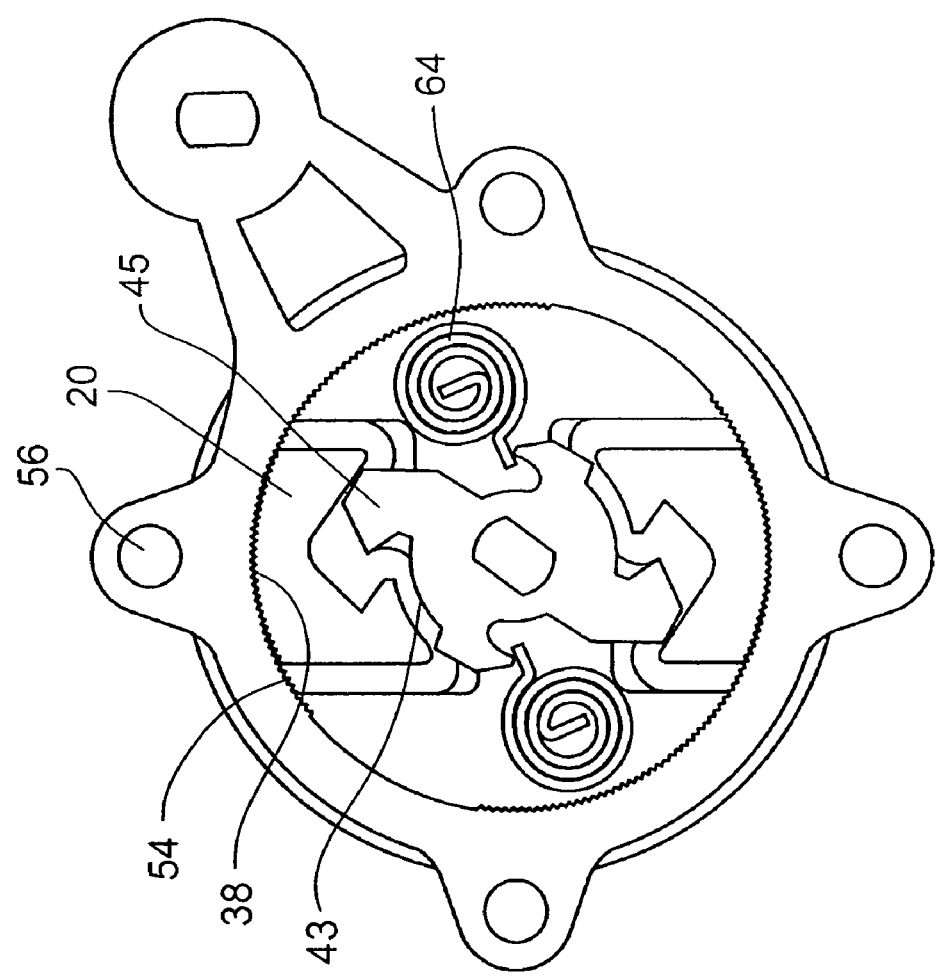
FIG. 11 is a general view showing a locking situation by a recliner of a seat for a vehicle in the first embodiment of the present invention.
Figure 12:
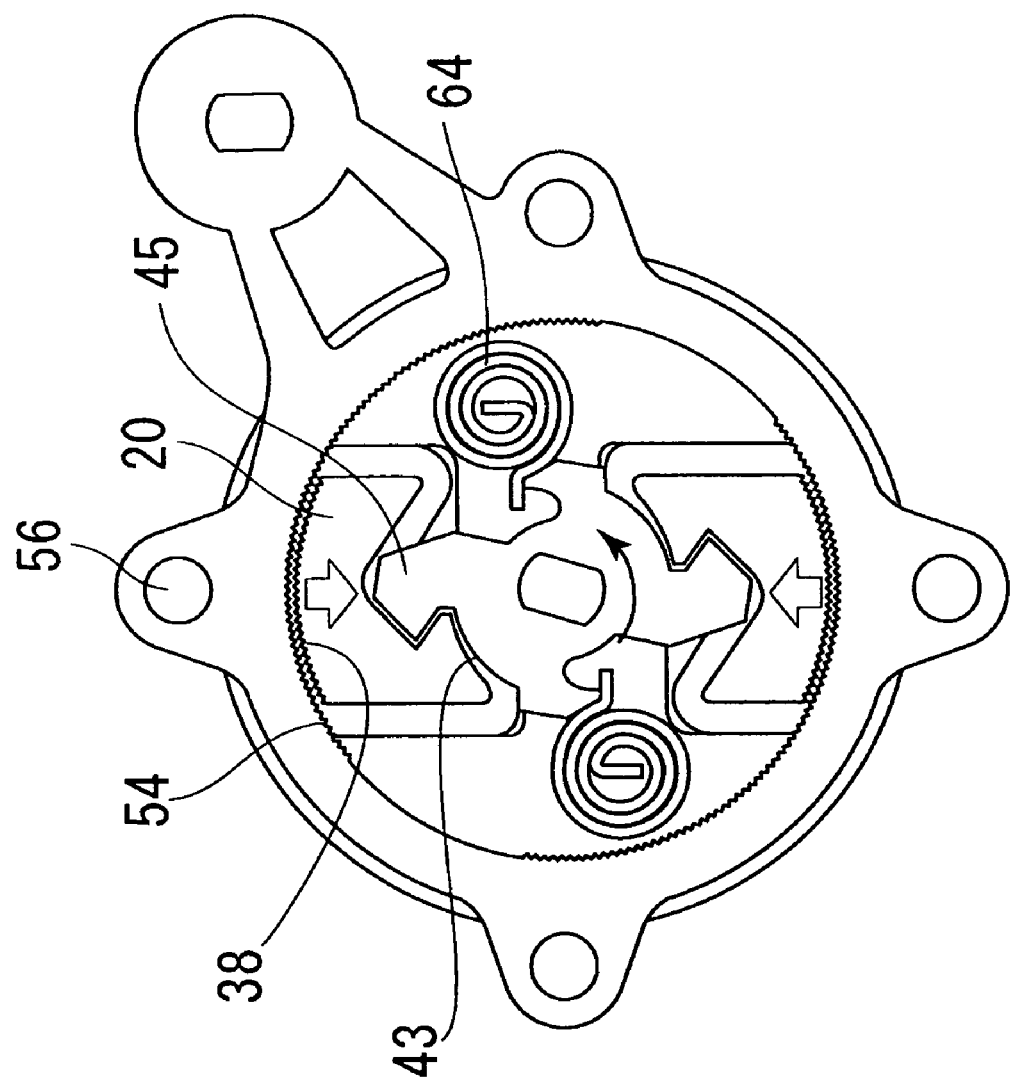
FIG. 12 is a general view showing a lock releasing situation by a recliner of a seat for a vehicle in the first embodiment of the present invention.

Explaining about the cam 18, as shown in FIGS. 11 and 12, the cam 18 comprises a perforated hole 17 provided on its central portion which is interposed between the pair of sliding lock members 20 and into which the pivot shaft 24 provided on the actuation lever 22 penetrates. The size of the perforated hole 17 is such that the cam 18 rotates together with the pivot shaft 24 in the same direction by the rotation of the pivot shaft 24. This causes the cam 18 to be rotated due to the rotation of the actuation lever 22. An engaging portion 43 engaging the protruding engaging portion 42 inwardly protruding and a protruding engaging portion 45 continuously and outwardly extending from the engaging portion 43 are provided on each of surfaces of the cam 18 facing the corresponding sliding lock member 20. An external shape of the cam 18 is shaped to be symmetrical with respect to its central point and the thickness thereof is set to be a little thinner than that of the rotational arm 14 described below so as not to extend up to the pair of openings 28 of the base member 16 when the cam 18 is disposed within the circular opening 52 of the rotational arm 14, unlike the pair of the sliding lock members 20. This allows for the cam 18 to be freely rotated within the circular opening 52.

Explaining about the rotational arm 14, the rotational arm 14 is an annular ring made of steel, and a circular opening 52 is provided on an inner portion thereof. In respective upper and lower portions of the annular ring constituting the circular opening 52, the inner teeth 54 mating with the outer teeth 38 of each of the sliding lock members 20 are provided on a predetermined range of the inner peripheral surface of the rotational arm 14. Since a load transmitting path between the seat back B and the seat cushion C is formed by the mating of the outer teeth 38 with the inner teeth 54 when each of the pair of sliding lock members 20 is moved to the engaging position, the thickness of the annular ring made of steel is set in such a way that the outer teeth 38 can withstand such a load. The thickness of the annular ring made of steel is 3.6 mm, for instance. In this connection, the annular ring made of steel may be formed with the circular opening 52 to form the outer teeth 38 by blanking a circular plate with an uniform thickness in a fine blanking manner.

Four bracket portions 56 by which the rotational arm 14 is mounted on the seat back B are provided on the outer peripheral portion of the rotational arm 14 with each being equally angularly spaced apart from each other in the outer peripheral direction. A perforated hole 63 into which a hold pin 62 5 penetrates is provided on each of the brackets 56. In this connection, the brackets 56 may be formed integrally with the annular ring.

On the side of the rotational arm 14 opposite to the side where the base member 16 is located, a lid plate 58 is mounted so as to close the circular opening 52 and a perforated hole 60 into which the pivot shaft 24 penetrates is provided on a central portion of the lid plate 58. The size of the perforated hole 60 is such that the lid plate 58 can be rotated together with the pivot shaft 24 by the rotation of the pivot shaft 24, like the cam 18. This causes the lid plate 58 to be rotated by the rotation of the actuation lever 22. The lid plate 58 is a circular plate the diameter of which is the same as that of the annular ring, and, like the rotational arm 14, four bracket portions 67 are provided on its outer peripheral portion with being equally angularly spaced apart from each other. A perforated hole 65 into which a hold pin 62 described below penetrates is provided on each of the bracket portions 67. The lid plate 58 can be fixed to the rotational arm 14 so as to hold the pair of sliding lock members 20, the cam 18, springs 64 described below inside the circular opening 52 of the rotational arm 14 by penetrating the hold pin 62 into the perforated hole 63 and the corresponding perforated hole 65 of the lid plate 58 and then crimping it. In addition, as shown in FIG. 8, the base member 16 can be fixed by abutting a shoulder portion of the hold pin 62 against a peripheral edge portion of the base member 16. Further, as described above, by utilizing the lid plate 58, a bracket for providing the pulley 128 for the oblique wire 110 is provided on the outer peripheral portion of the lid plate 58.

In this connection, since the lid plate 58 only functions to close the circular opening 52 and does not function as a strength member, the thickness of the rotational arm 14 is 3.6 mm, for instance, whereas, that of the lid plate may be about 0.6 mm.

As shown in FIG. 9, the actuation lever 22 is mounted on the outer side of one of the recliners 10, and includes a perforated hole at one end. The actuation lever 22 can be fixed by penetrating the pivot shaft 24 into this perforated hole, the perforated hole 33, the base member 16, the cam 18, and the perforated hole 60 of the lid plate 58. The actuation lever 22 is biased so as to be rotated in one direction by a pair of springs 64 disposed within the circular opening 52.

A spiral spring 70 is provided on the outer side of one of the recliners 10 so as to be substantially parallel to and adjacent to the base member 34. The seat back B can be biased so as to be rotated in one direction relative to the seat cushion C due to the fact that one end of the spiral spring 70 is fixed on the seat back B, while the other end thereof is fixed on a holder bracket 72 provided on the base bracket 34.

An effect of the seat 100 for the vehicle including such a structure will be described with reference to FIGS. 11 to 14.

Firstly, in a case where the seat back B is locked to the seat cushion C, the actuation lever 22 is biased by the spring 64, so that, as shown in FIG. 11, each of the engaging portions 43 of the cam 18 is caused to engage the protruding engaging portion 42 of the cam surface 40 of the corresponding sliding lock member 20. This causes each of the sliding lock members 20 to be guided along the guiding side wall 30 of the base member 16 to be outwardly moved, whereby the outer teeth 38 and the corresponding inner teeth 54 of the rotational arm 14 mate with each other, and as a result, the locking situation in which the rotation of the rotational arm 14 relative to the base member 16 is restricted is maintained.

Under such a locking situation, in a case where an excessive impact load is loaded on the seat back B due to the collision, for instance, the excessive impact load is transmitted to the rotational arm 14 from the seat back B through the mounting portion 36, and then, is transmitted to the seat cushion C fixed on the base member 16 through the mating of the outer teeth 38 of the pair of sliding lock members 20 with the inner teeth 54 of the rotational arm 14, the engagement of the cam surface 40 of each of the pair of sliding lock members 20 with the cam 18, and the pivot shaft 24 penetrating into the cam 18. Since the thickness of the annular ring of the rotational arm 14, or the thickness of the outer teeth 38 and the thickness of the base member 16 are set to be at a value so as to withstand such an impact load, the reclining function can be maintained irrespective of such an impact load.

In this case, since the rotational arm 14 includes the circular opening 52 at its inner portion, the weight of the recliner can be decreased as compared to a conventional sector gear into which a circular plate with a uniform thickness is formed by a press working. On the other hand, four brackets 56, each including a perforated hole 63 by which the rotational arm 14 is mounted on the seat back B, are provided on an outer peripheral portion of 5 the annular ring with being angularly equally spaced apart from each other, so that the weight of the recliner is increased. However, as compared to the conventional circular sector gear in which six protruding surfaces by which the rotational arm 14 is fixed on the seat back B are provided with being angularly equally spaced apart from each other, since the longer a distance between the bracket 56 and the pivot shaft 24 becomes, the less a load which one bracket 56 shares becomes, whereby the number of the bracket portions 56 can be decreased. This causes the weight of the bracket portions 56 of the seat back B to be further decreased.

More specifically, in a case where the impact load toward the front side of the vehicle is loaded on the seat back B due to the collision, for instance, when such an impact load is transmitted to the seat cushion frame structure 104 104 through the recliner structure portion 114, a bending moment which increases toward the rotational center is generated on each of the pair of side frames 140A,B of the seat cushion frame structure 104 portion 104. In this case, since each of the oblique wires 102A,B is positioned in such a way that its lower end P2 is located to be forward of the upper end P1 and is in the form of the wire, no compressive force is generated on the oblique wires 102A,B due to the impact load. A structural integrity of the seat for the vehicle 100 can be maintained by setting a cross sectional shape of each of the pair of side frames 140A,B to secure a section modulus so as to withstand such a bending moment.

Figure 13:
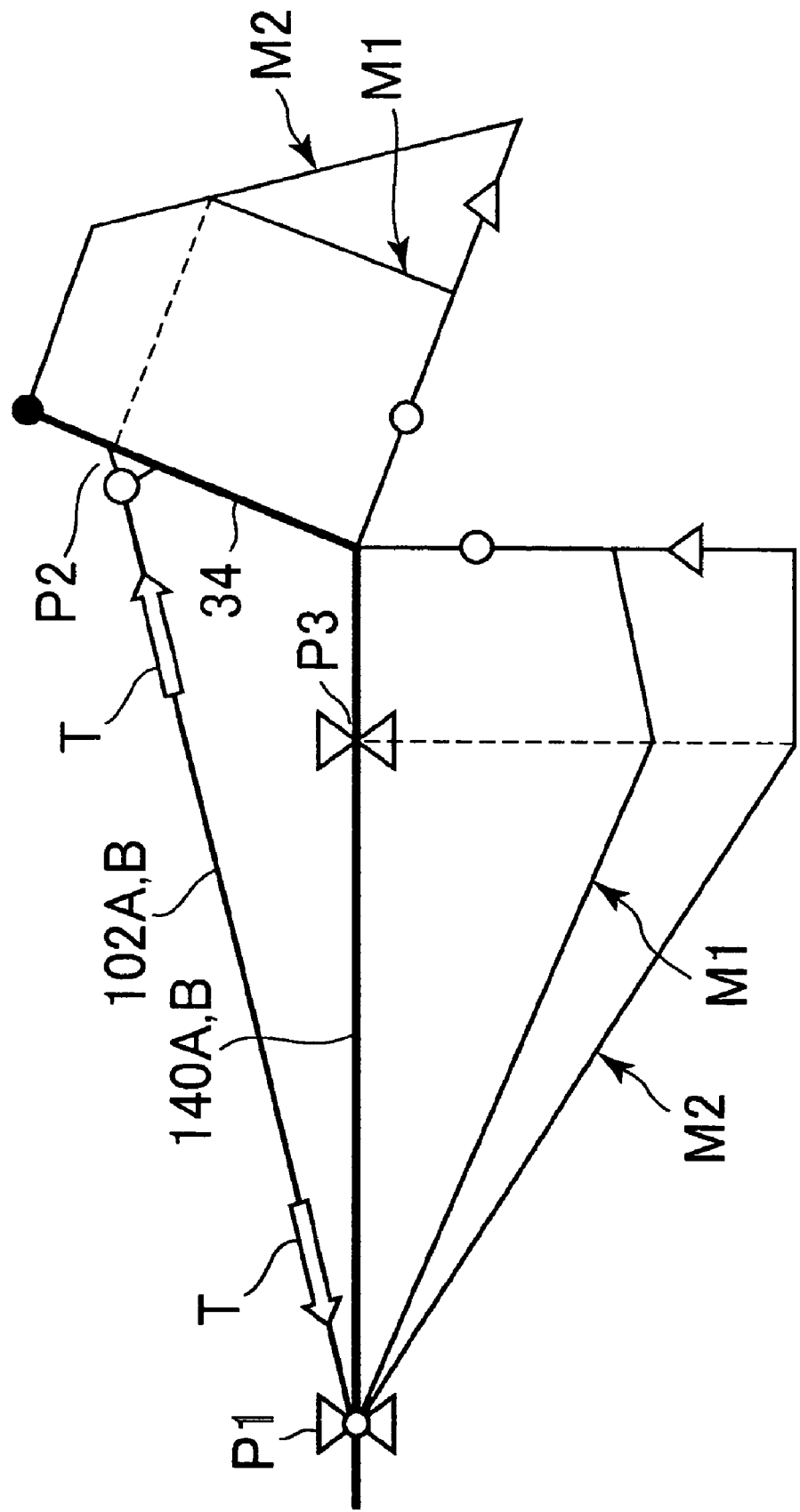
FIG. 13 is a view showing a moment generated on a seat cushion frame structure in a case where an impact load toward the rear side of the vehicle is loaded in the first embodiment of the present invention.

On the other hand, as shown in FIG. 13, in a case where the impact load toward the rear side of the vehicle, which is larger than that toward the front side of the vehicle, is loaded on the seat back B due to the collision, for instance, a bending moment which increases toward the rotational center is generated on each of the pair of side frames 140A,B of the seat cushion frame structure 104 portion 104. In this case, a tension force is generated on the oblique wires 102A,B provided on the pair of side frames 140A,B to alleviate the bending moment on the seat cushion frame structure 104 104 caused by the impact load. FIG. 13 shows a bending moment M2 which is generated in a case where no oblique wires are provided and a bending moment M1 which is generated in a case where oblique wires 102A,B are provided. As shown in FIG. 13, M1 is shown to be smaller than M2.

In this connection, a similar effect is caused for the oblique wires 110A,B provided on the seat back frame structure 112 112.

The necessary strength or rigidity of the side frames 140A,B can be secured, while the weight thereof can be decreased, by having the oblique wires 102A,B share the difference between the impact load toward the front side of the vehicle and that toward the rear side of the vehicle without setting a cross sectional shape of the pair of side frames 140A,B with respect to the large impact load toward the rear side of the vehicle. In particular, conventionally, the main side surface portion of the side frame with a width extending in the vertical direction was formed so as to be diverged toward the rotational center in the longitudinal direction, however, such a degree of divergence can be decreased, or such a tapering in the divergent manner can be substantially deleted.

In this connection, in a case where the locking situation in which the seat back B is locked to the seat cushion C is released to rotate the seat back B, since, by rotating the actuation lever 22 against the biasing force of the coil spring 64, the cam 18 is also rotated in the same direction, as shown in FIG. 12, the engagement situation in which the engaging portion 43 of the cam 18 engages the protruding engaging portion 42 of each of the sliding lock members 20 is released. When the seat back B is inclined under this situation, the rotational arm 14 is caused to be rotated so that each of the sliding lock members 20 inwardly slides by a force exerted thereon from the inner teeth 54, and as a result, the engaging concave portion 44 of each of the sliding lock members 20 and the corresponding protruding engaging portion 45 of the cam 18 are brought into engagement with each other. Under such a circumstance, the mating of the inner teeth 54 with the outer teeth 38 is released. This causes the locking situation to be released, whereby the seat back B can be inclined relative to the seat cushion C by a desired angle. After the seat back B is inclined, the cam 18 is rotated in the opposite direction to cause the sliding lock members 20 to slide outwardly in the radial direction again, so that the inner teeth 54 are caused to mate with the corresponding outer teeth 38 again returning back to the locking situation.

According to the seat cushion frame structure 104 of the seat 100 for the vehicle including the above described structure, with respect to the supposed impact load loaded on the seat back frame structure 112 112, since the impact load toward the rear side of the vehicle is set to be higher than that toward the front side of the vehicle, in a case where such an impact load is transmitted to the seat cushion frame structure 104 through the connection portion between the seat back frame structure 112 and the seat cushion frame structure 104 104, a cross sectional shape of each of the pair of side frames 140A,B is determined in such a way that a section modulus of each of the pair of side frames 140A,B is set so as to withstand a bending moment due to the impact load loaded on the front side of the vehicle. In a case where the impact load is loaded on the rear side of the vehicle, by positioning oblique wires 102A,B so as to cause a tension force to exert on the seat cushion frame structure 104 104 from the oblique wires 102A,B so as to alleviate a bending moment acting on the seat cushion frame structure 104 caused by such an impact load, the oblique wires 102A,B can share the difference between the impact load toward the front side of the vehicle and that toward the rear side of the vehicle.

On the other hand, since each of the oblique wires 102A,B includes a characteristics in which it does not resist an outer compressive force, a structural integrity of each of the oblique wires 102A,B can be maintained due to the fact that it does not function as a strength member upon the impact load toward the front side of the vehicle being loaded.

As stated above, since a determination of a sectional shape of the pair of side frames 140A,B so as to withstand the impact load toward the rear side of the vehicle becomes unnecessary, the strength or the rigidity required for the side frames can be secured, while at the same time, the weight of the pair of side frames 140A,B can be decreased.

In this case, in a case where the seat for the vehicle 100 is completed by applying a pad to the frame structure, the appearance of the seat for the vehicle 100 can be prevented from being deteriorated by embedding the oblique wires 102A,B into a pad.

Figure 14:
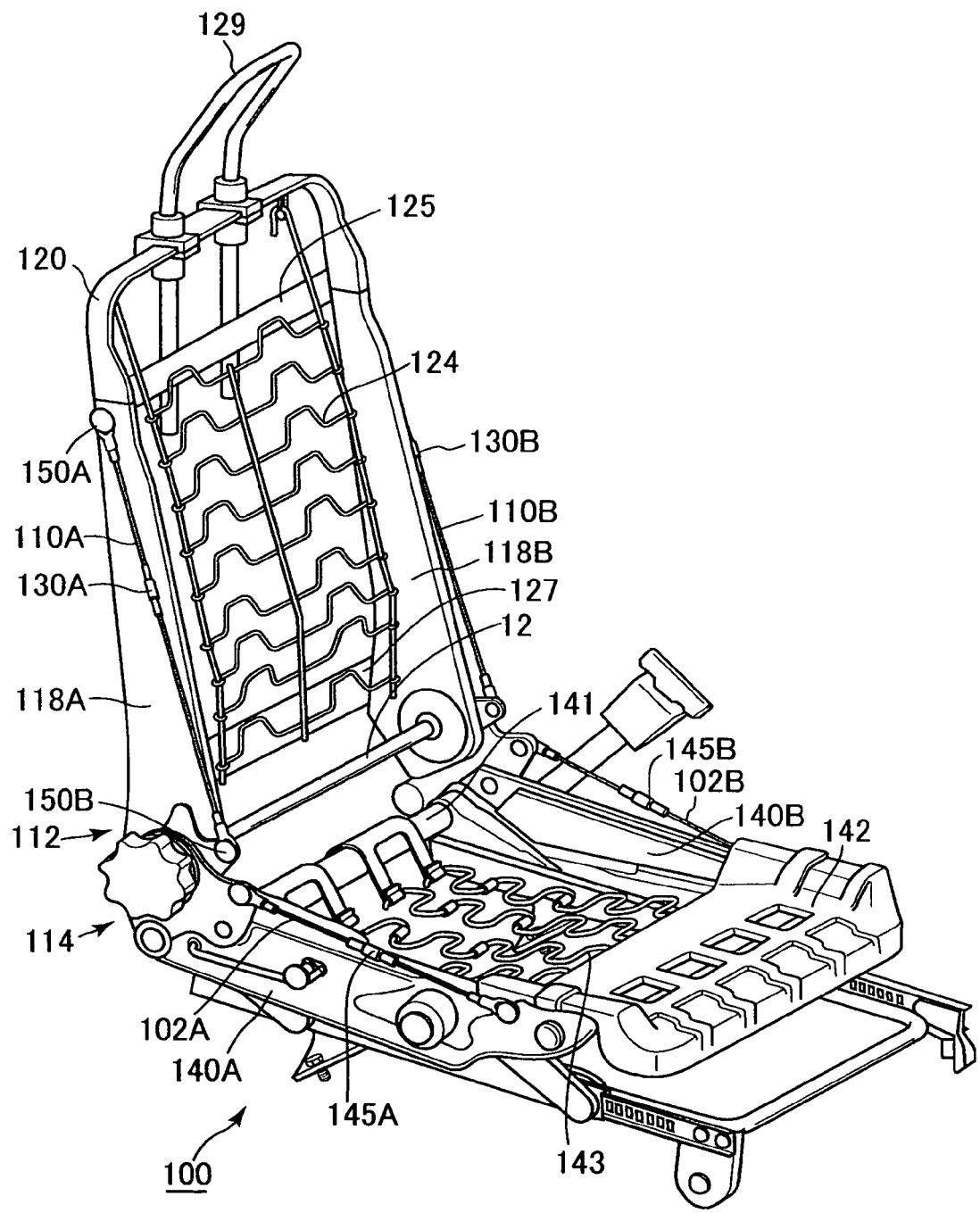
FIG. 14 is a perspective view showing a seat for a vehicle in a second embodiment of the present invention.
Figure 15:
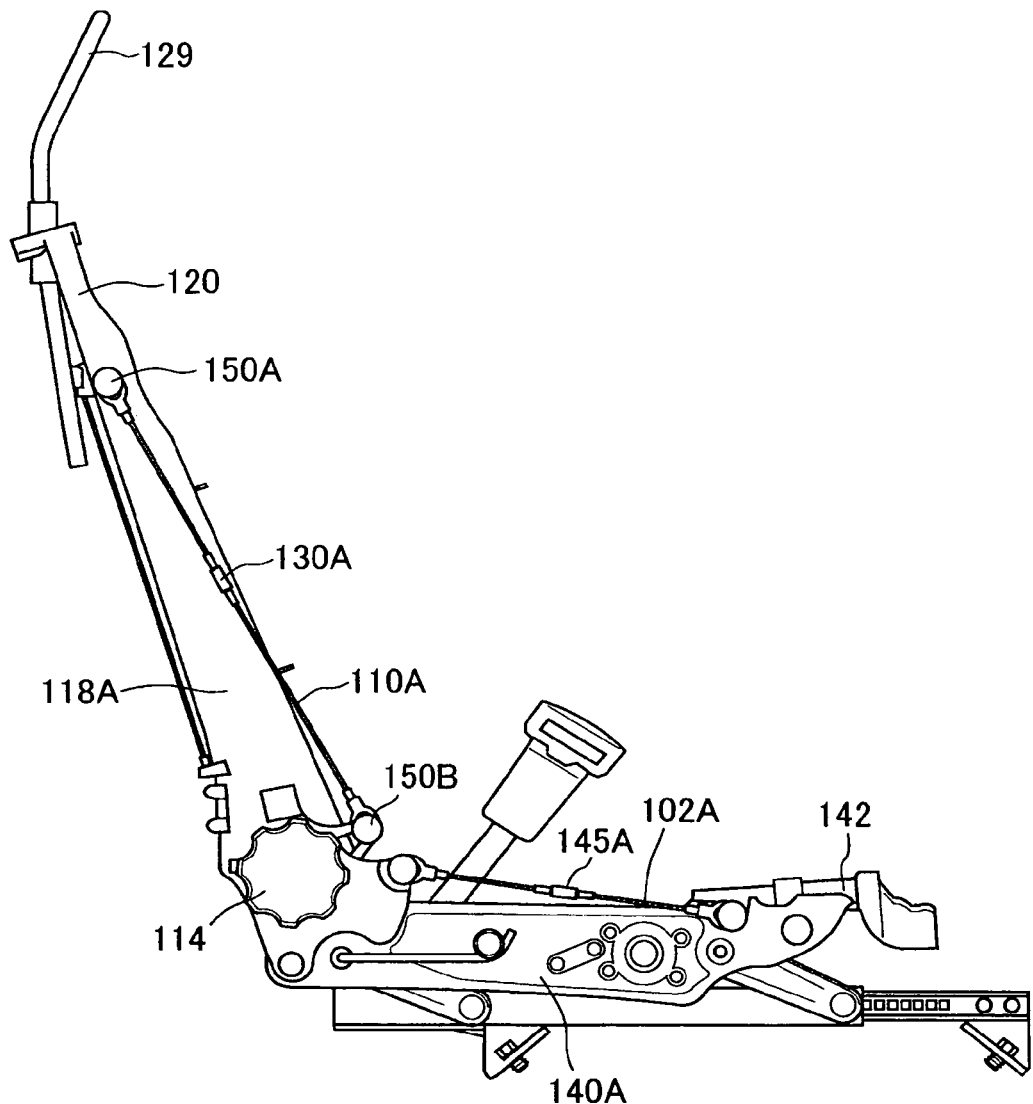
FIG. 15 is a side view showing a seat for a vehicle in the second embodiment of the present invention.
Figure 16:
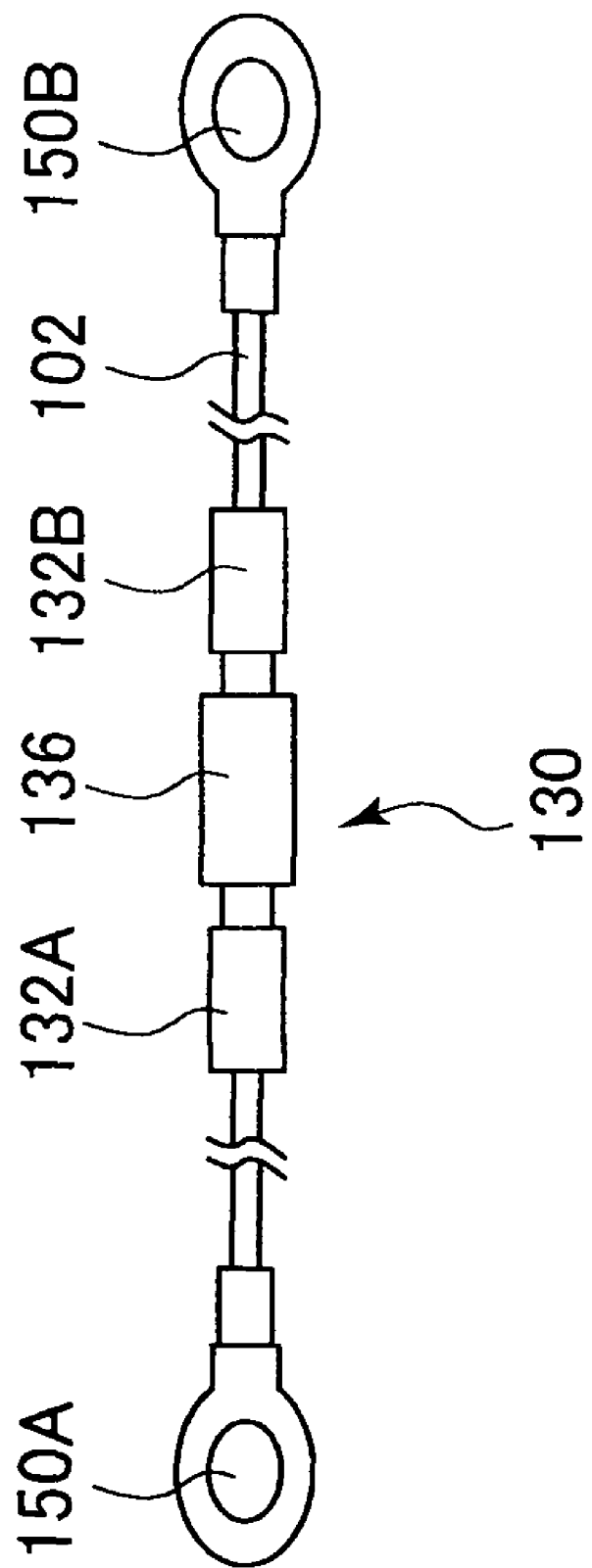
FIG. 16 is a view showing an oblique wire in the second embodiment of the present invention.

A second embodiment of the present invention will be described with reference to the drawings. FIG. 14 is a perspective view showing a seat for a vehicle in the second embodiment of the present invention. FIG. 15 is a side view showing a seat for a vehicle in the second embodiment of the present invention. FIG. 16 is a view showing an oblique wire in the second embodiment of the present invention.

In the following description, with respect to the same elements as those in the first embodiment, an explanation thereabout is omitted by attaching the same reference numbers to those elements, and the technical feature of this embodiment will be described in detail.

The technical feature of this embodiment lies in the structure of the oblique wires 110A,B and 102A,B. More specifically, in the first embodiment, the wire formed in an endless manner is wound around pulleys 128A,B and pulleys 147A,B, whereas, in the second embodiment, a single wire is adopted. Since the technical feature of the oblique wire 110 is the same as that of the oblique wire 102, the technical feature of the oblique wire 110 will be only described.

More specifically, in the oblique wire 110, the upper end is fixed on a pin (not shown) provided on the side frame 118 through an opening of a fixing ring 150A, while the lower end is fixed on a pin (not shown) provided on the 15 bracket portion 65 of the recliner structure portion 114 through an opening of a fixing ring 150B. Such being the case, a single wire is obliquely extended on each side of the pair of side frames 118A,B.

According to the oblique wires 110A,B including such a structure, in case of an impact load similar to the first embodiment, for instance, in the first embodiment, it is like the situation in which two wires 110 are provided between the pulleys 128A,B, whereas, in the second embodiment, it is like the situation in which one single wire is provided. In this respect, the wire can be provided without a need to provide two pulleys 128A,B, even though the thickness of the wire has to be increased.

In this connection, in order to adjust the length of the oblique wires 110A,B, similar to the first embodiment, a bolt-nut mechanism 130 is provided on an intermediate portion of the wire to adjust the length of the wire by adjusting the amount of the bolt 132 threading into the nut 136.

Figure 18:
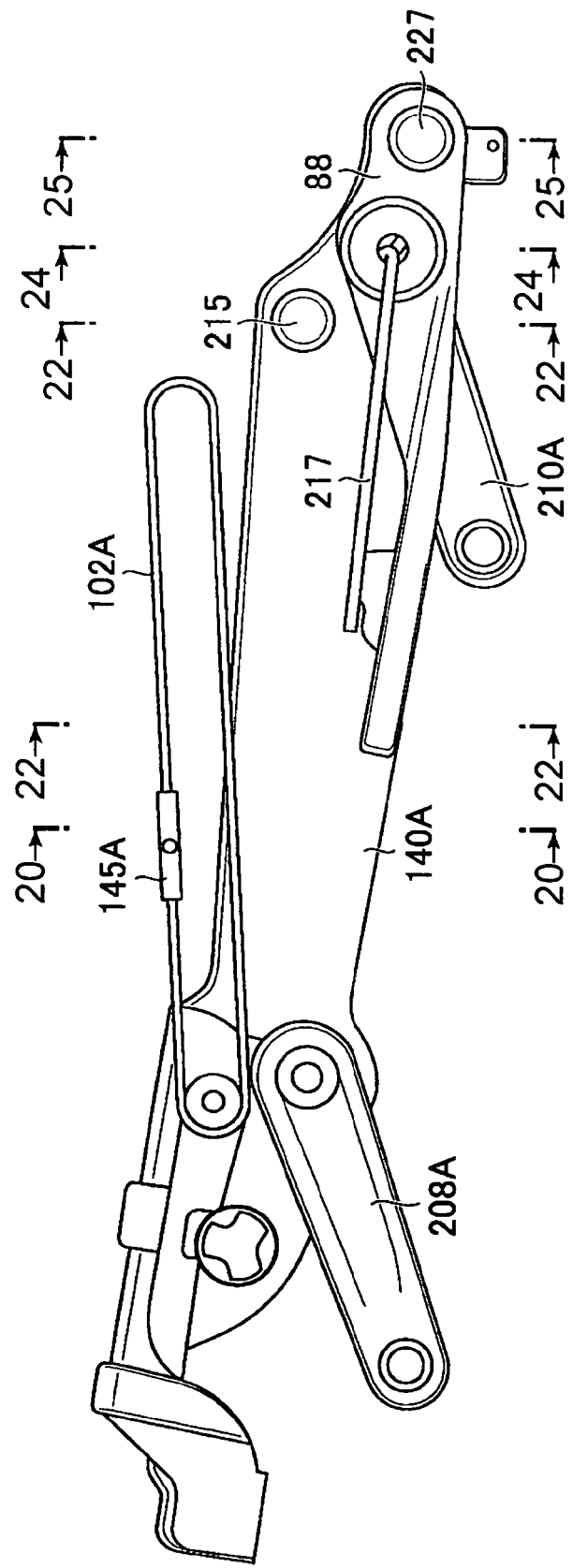
FIG. 18 is a side view showing a frame structure of a seat cushion of a seat for a vehicle in a third embodiment of the present invention.
Figure 19:
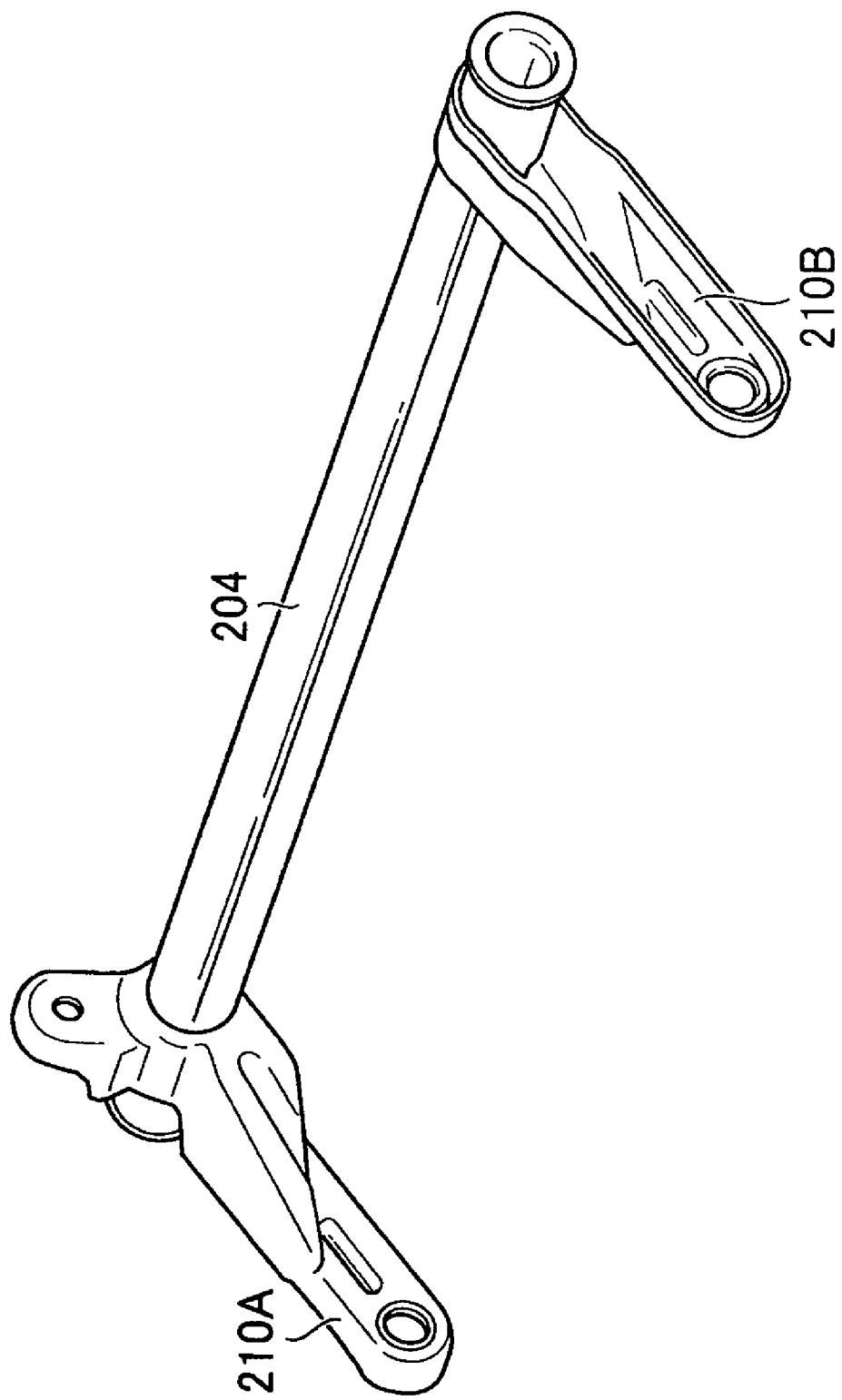
FIG. 19 is a perspective view showing a rear link and a rear pipe of a lifter mechanism of a seat cushion of a seat for a vehicle in the third embodiment of the present invention.
Figure 20:
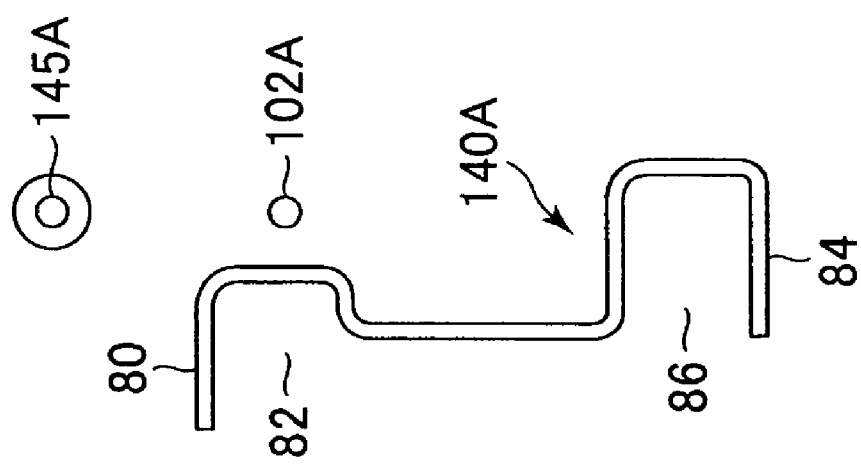
FIG. 20 is a cross sectional view taken along a line A-A in FIG. 18.
Figure 21:
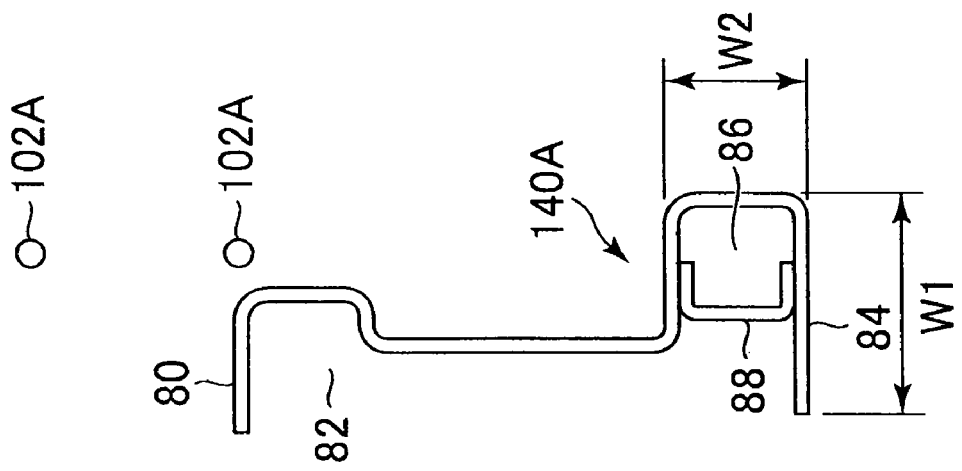
FIG. 21 is a cross sectional view taken along a line B-B in FIG. 18.
Figure 22:
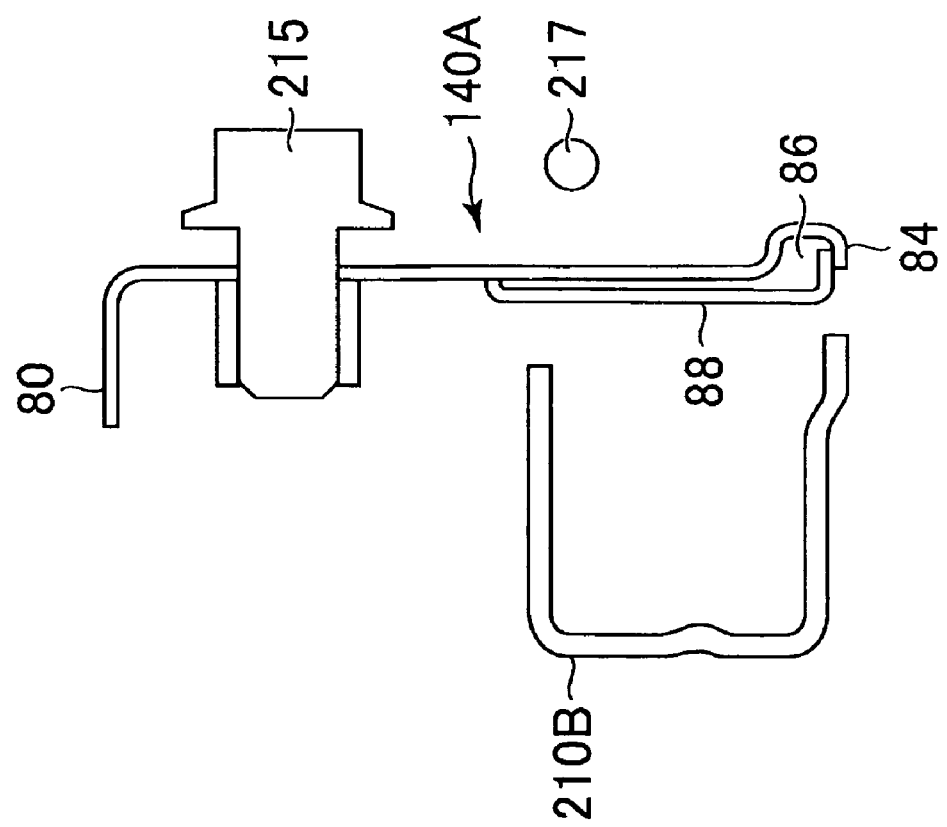
FIG. 22 is a cross sectional view taken along a line C-C in FIG. 18.
Figure 23:
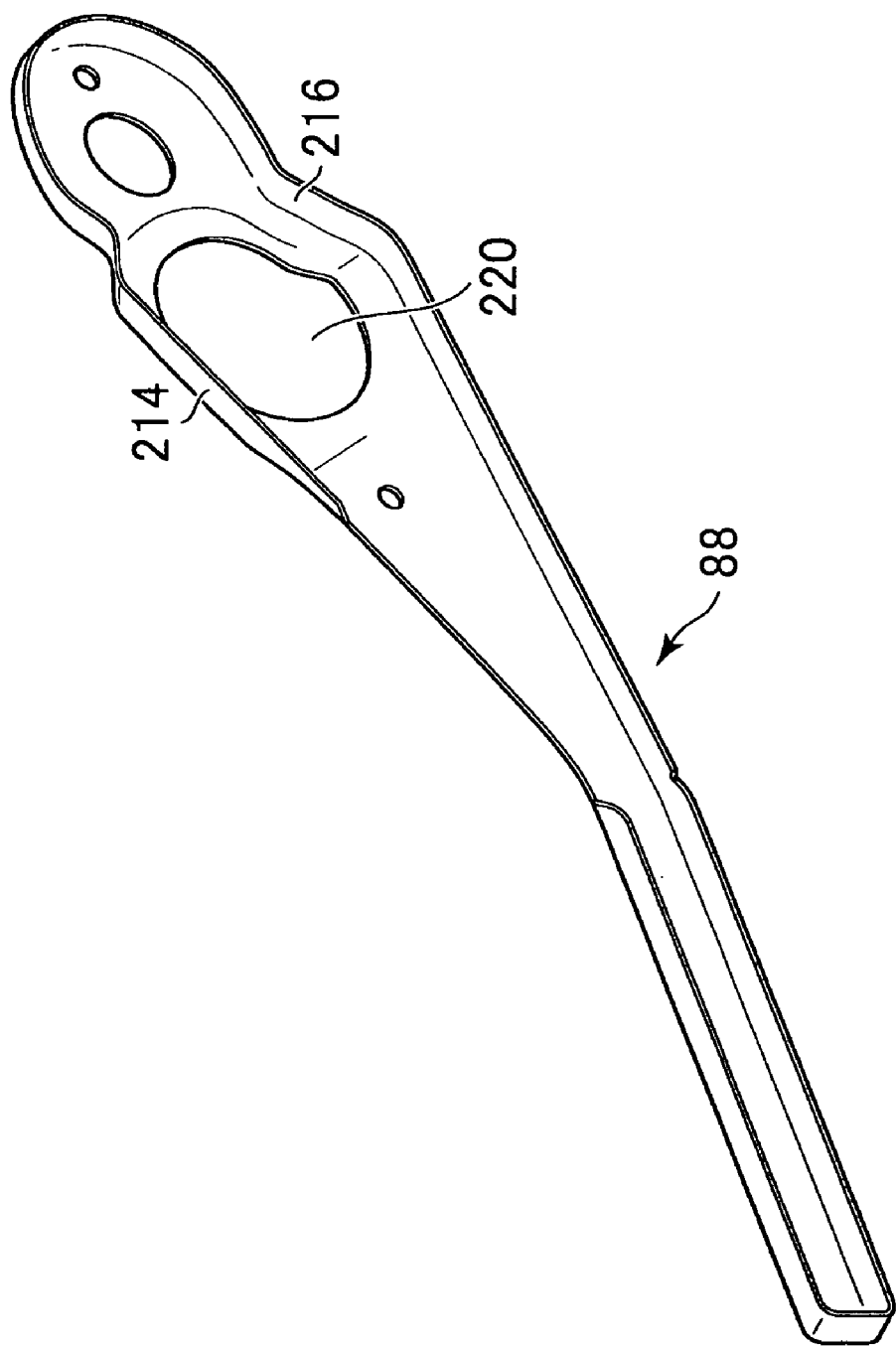
FIG. 23 is a perspective view showing a reinforcing bracket provided on a frame structure of a seat cushion of a seat for a vehicle in the third embodiment of the present invention.
Figure 24:
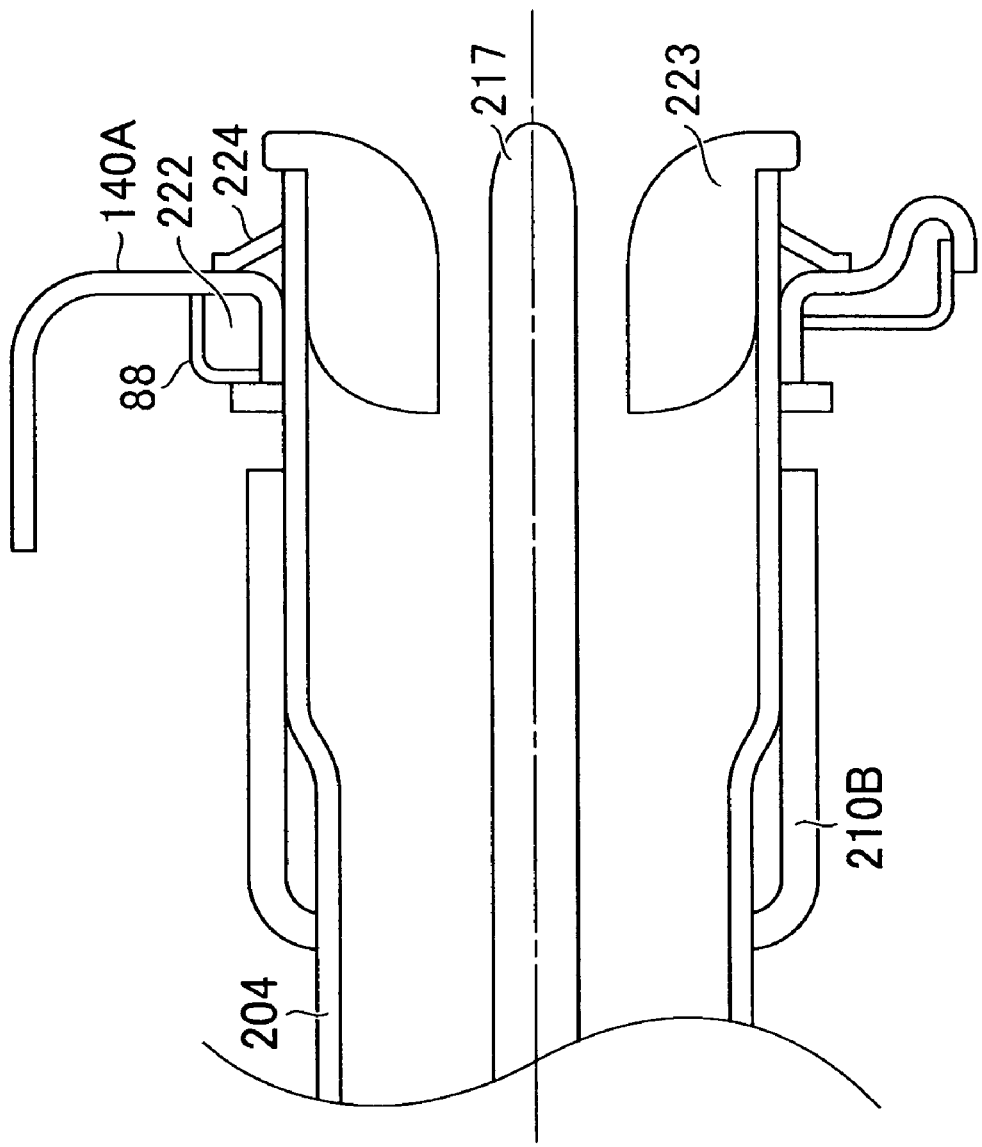
FIG. 24 is a cross sectional view taken along a line E-E in FIG. 18.
Figure 25:
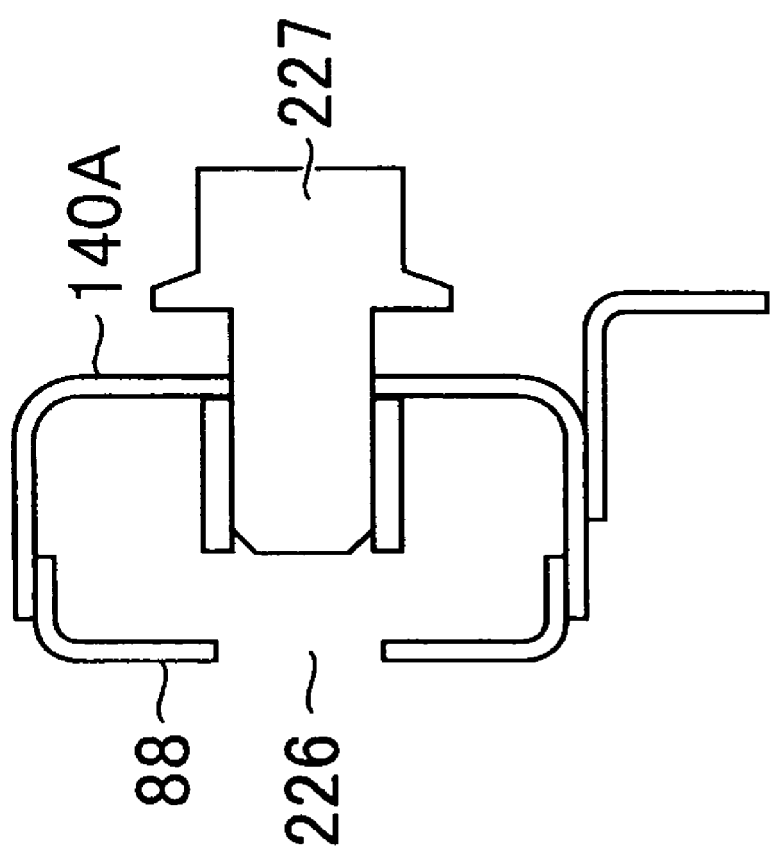
FIG. 25 is a cross sectional view taken along a line D-D in FIG. 18.

A third embodiment of the present invention will be described with reference to the drawings. FIG. 17 is a general view showing a stress generated on a side frame of a frame structure of a seat cushion C in a resolved manner in a case where an impact load toward the rear side of the vehicle is loaded on a frame structure of a seat cushion C of a seat for a vehicle on which the oblique wire is mounted. FIG. 18 is a side view showing a frame structure of a seat cushion C of a seat for a vehicle in a third embodiment of the present invention. FIG. 19 is a perspective view showing a rear link and a rear pipe of a lifter mechanism of a seat cushion C of a seat for a vehicle in the third embodiment of the present invention. FIG. 20 is a cross sectional view taken along a line A-A in FIG. 18. FIG. 21 is a cross sectional view taken along a line B-B in FIG. 18. FIG. 22 is a cross sectional view taken along a line C-C in FIG. 18. FIG. 23 is a perspective view showing a reinforcing bracket provided on a frame structure of a seat cushion C of a seat for a vehicle in the third embodiment of the present invention. FIG. 24 is a cross sectional view taken along a line E-E in FIG. 18. FIG. 25 is a cross sectional view taken along a line D-D in FIG. 18.

In the following description, with respect to the same elements as those in the first embodiment, an explanation thereabout is omitted by attaching the same reference numbers to those elements, and the technical feature of this embodiment will be described in detail.

The technical feature of this embodiment lies in the fact that a reinforcing bracket is provided on the sideframes 140A,B due to the provision of the oblique wires 102A,B on the side frames 140A,B to locally reinforce the side frames 140A,B.

The inventor confirmed that the following technical problems are caused due to the provision of the oblique wires shown in the first and second embodiments through the experiments.

Firstly, in a case where the impact load toward the rear side of the vehicle is loaded on the seat cushion frame structure 104, since a compressive stress in addition to a bending moment acts on the seat cushion frame structure 104 due to the component of the tension force generated on the oblique wires, the buckling at the lower side of the seat cushion frame structure 104 tends to be easily generated.

More specifically, as shown in FIG. 17(A) (the left side in the drawing indicates the fronts side of the vehicle), in a case where the impact load toward the rear side of the vehicle is loaded on the upper portion of the seat back frame structure 112, a bending moment is generated on the seat cushion frame structure 104 through the connection portion between the seat cushion frame structure 104 and the seat back frame structure 112 so as to increase as a longitudinal position approaches the rear end of the vehicle, and thus, a tension force is loaded on the upper side of the vehicle, while a compressive force is loaded on the lower side of the vehicle, a neutral axis N-N of the seat cushion frame structure 104 being a boundary between these forces. On the other hand, as shown in FIG. 17(B), a compressive force in the longitudinal direction of the vehicle exerts on the seat cushion frame structure 104 due to a component Ry in the longitudinal direction of a tension force R generated on the oblique wires. Since these stresses are superimposed to be loaded on the seat cushion frame structure 104, as shown in FIG. 17(C), a position where the stress exerting on the seat cushion frame structure 104 is counted to be zero is shifted to the upper side of the vehicle, as compared to FIG. 17(A), while a higher compressive stress is loaded on the lower side of the vehicle. The buckling tends to be easily generated on the seat cushion frame structure 104 due to such a higher compressive force.

However, if the seat cushion frame structure 104 is reinforced in order to prevent such a buckling, its weight is rather caused to increase due to the oblique wires provided in order to attain the decrease of the weight and the high rigidity.

Secondly, the strength of the side frames supporting a lifter mechanism tends to become insufficient due to the provision of the lifter mechanism on the seat cushion frame structure 104.

More specifically, the lifter mechanism comprises a front pipe which connects the front portions of the pair of side frames and extends in the widthwise direction (the direction perpendicular to the longitudinal direction of the vehicle), and a rear pipe which connects the rear portions of the pair of side frames and extends in the widthwise direction. The front pipe is supported by each of the front portions of the pair of the side frames so as to be pivoted about the widthwise direction, while the rear pipe is supported by each of the rear portions of the pair of the side frames so as to be pivoted about the widthwise direction. In addition, a parallel link mechanism connecting the lower surface of the vehicle and the seat cushion C is provided. The parallel link mechanism comprises a pair of front links, one end of each of which is supported by the lower surface of the vehicle so as to be pivoted about the widthwise direction of the vehicle and the other end of which is supported by the front pipe so as to be pivoted about the widthwise direction, and a pair of rear links, one end of each of which is supported by the lower surface of the vehicle so as to be pivoted about the widthwise direction of the vehicle and the other end of which is supported by the rear pipe so as to be pivoted about the widthwise direction.

Each of the pair of side frames includes a perforated hole into which the rear pipe penetrates, so that its strength is locally lowered due to the provision of an opening, and thus, it is desirable to reinforce the supporting portion of the rear pipe.

As stated above, in this embodiment, a seat cushion frame structure 104 of a seat for a vehicle including the oblique wires and a seat for the vehicle with such a seat cushion frame structure 104 which are capable of effectively preventing its buckling, while at the same time restricting the increase of the cost and the weight are provided.

Explaining about the lifter mechanism 200 provided on the seat cushion frame structure 104 104, as shown in FIGS. 18 and 19, the lifter mechanism 200 comprises a front pipe 202 which connects the front portions of the pair of side frames 140A,B and extends in the widthwise direction (the direction perpendicular to the longitudinal direction of the vehicle), and a rear pipe 204 which connects the rear portions of the pair of side frames 140A,B and extends in the widthwise direction. The front pipe 202 is supported by each of the front portions of the pair of the side frames 140A,B so as to be pivoted about the widthwise direction, while the rear pipe 204 is supported by each of the rear portions of the pair of the side frames 140A,B so as to be pivoted about the widthwise direction. In addition, a parallel link mechanism 206 connecting the lower surface of the vehicle and the seat cushion C is provided. The parallel link mechanism 206 comprises a pair of front links 208, one end of each of which is supported by the lower surface of the vehicle so as to be pivoted about the widthwise direction of the vehicle and the other end of which is supported by the front pipe 202 so as to be pivoted about widthwise direction, and a pair of rear links 210, one end of each of which is supported by the lower surface of the vehicle so as to be pivoted about the widthwise direction of the vehicle and the other end of which is supported by the rear pipe 204 so as to be pivoted about widthwise direction.

In this connection, since the lifter mechanism 200 is a conventional one which includes a mechanism for keeping the seat cushion C at a predetermined level and a mechanism for rotating the parallel link mechanism 206 about the widthwise direction of the vehicle, an explanation thereabout in detail is omitted.

As shown in FIGS. 20 to 22, each of the pair of side frames 140A,B includes an entire cross sectional structure in which a C-shaped concave portion 82 around the edge portion 80 on the upper portion side of the vehicle and a C-shaped concave portion 86 around the edge portion 84 on the lower portion side of the vehicle are included. As compared to the side frames 140A,B, in each of which a main side surface portion with a width in the vertical direction mainly defining an external shape and protruding flanges inwardly protruding from the upper and lower edges 216 of the main side surface portion, respectively, form a C-shaped cross section inwardly oriented, a section modulus of each of the side frames 140A,B with respect to a bending moment about the vertical direction can be augmented by increasing the portion extending in the direction perpendicular to the vertical direction.

As shown in FIG. 21, an concave portion 86 around the edge portion 84 on the lower side of the vehicle is closed by a reinforcing bracket 88 extending in the longitudinal direction of each of the side frames 140A,B so as to form a closed cross section. This effectively prevents a buckling on the lower side of the vehicle at each of the side frames 140A,B from being generated due to the impact load toward the rear side of the vehicle. The reinforcing bracket 88 may be fixed on each of the side frames 140A,B by welding, for instance.

The width of the closed cross section in the direction perpendicular to the vertical direction (W1 in FIG. 21) may be determined in view of a section modulus required for the side frames 140A,B with respect to a bending moment about the vertical direction. On the other hand, the width of the closed cross section in the vertical direction (W2 in FIG. 21) may be determined so as to effectively prevent such a buckling, and is no greater than a distance between a neutral axis (N-N in FIG. 17) with respect to a bending moment caused by the oblique wires 102A,B due to the impact load toward the rear side of the vehicle and the edge portion 84 on the lower side of the vehicle of the side frames 140A,B.

In particular, as described below, it is preferable that the shape of the closed cross section be square, in view of the prevention of the buckling.

As shown in FIG. 23, the reinforcing bracket 88 is an elongated plate, more specifically, it extends in the longitudinal direction around the edge portion 84 on the lower side of the vehicle and tapers in such a way that the width in the vertical direction is increased as a longitudinal position approaches the rear end of the vehicle. A flange is formed on the upper edge 214 and the lower edge 216, respectively.

The reinforcing bracket 88 is positioned so as to be along the lower edge of each of the side frames 140A,B on its inner surface, and, as shown below, the cross sectional shape varies in accordance with the position in the longitudinal direction. This is what differs from the reinforcing bracket 88 the inventor proposed with respect to the side frames 118A,B of the seat back frame structure 112 with the oblique wires.

As shown in FIG. 20, as described above, at the position forward of the central position of the length in the longitudinal direction of each of the side frames 140A,B, each of the side frames 140A,B includes an entire cross section structure including two C-shaped concave portions 82, 86, and with respect to the concave portion 86 around the edge portion 84 on the lower side of the vehicle, no reinforcing bracket is provided so that no closed cross section is formed. This is because, in the longitudinal direction, a value of a bending moment caused by the impact load toward the rear side of the vehicle exerting on the upper portion of the seat back frame structure 112 is comparatively small (refer to FIG. 17), and thus, the reinforcing bracket 88 is not necessary due to the small risk of the buckling of the side frames 140 A,B being caused.

As shown in FIG. 21, at the central position of the length in the longitudinal direction of the side frames 140A,B, the reinforcing bracket 88 is provided so as to close the opening portion of the C-shaped cross sectional structure on the lower side of the vehicle. More specifically, the upper surface of the flange provided on the upper edge 214 of the reinforcing bracket 88 and the lower surface of the flange provided on the lower edge 216 thereof are fixed on the lower surface of the upper portion and the upper surface of the lower portion of the C-shaped cross sectional structure, respectively, by welding, for instance.

As shown in FIG. 22, at the position where the rear link 210 of the lifter mechanism 200 is provided, the reinforcing bracket 88 is provided so as to close the opening portion of the C-shaped cross sectional structure on the lower side of the vehicle, similar to FIG. 21, but the closed cross sectional structure differs from that shown in FIG. 21. More specifically, the width W2 in the vertical direction of the reinforcing bracket 88 is made so wide that the reinforcing bracket 88 not only closes the opening portion of the C-shaped cross sectional structure on the lower side of the vehicle, but also upwardly extends beyond the top portion of the rear link 210 of the lifter mechanism 200 adjacent to the inner surface of the side frames 140A,B via the reinforcing bracket 88.

This prevents the buckling of the side frames 140A,B from being generated due to the provision of the oblique wires by reinforcing a portion around the edge 84 on the lower side of the vehicle, while this causes a portion where the rear link is provided to be reinforced by extremely flattening the cross sectional structure in the vertical direction to form a two-plate structure along with each of the side frame 140A,B. In this connection, the reference number 215 indicates a bolt by which the base bracket 34 of the recliner structure portion 114 is mounted on the seat cushion frame structure 104 104.

As shown in FIG. 24, at the position where a torsion bar 217 of the lifter mechanism 200 penetrates, each of the pair of side frames 140A,B includes a first perforated hole 218 into which the rear pipe 204 penetrates, while the reinforcing bracket 88 accordingly includes a second perforated hole 220 into which the rear pipe 204 penetrates and the second perforated hole 220 is provided so as to be aligned with the first perforated hole 218. As shown in FIG. 23, the reinforcing bracket 88 includes the maximum width in the vertical direction at the longitudinal position where the second perforated hole 220 is provided. In this connection, the torsion bar 217 is a spring which functions to upwardly bias the seat cushion C in a case where the seat cushion C is raised by an actuation lever (not shown).

More specifically, each of the pair of side frames 140A,B includes an annular flange 222 around the first perforated hole 218, and the annular flange 222 is provided so as to abut against the outer peripheral surface of the rear pipe 204 closed by a resin cap 223 at its end, so that the inner surface of each of the side frames 140A,B is pressed against the respective flanges provided on the upper edge 214 and the lower edge 216 of the reinforcing bracket 88 from outside of each of the side frames 140A,B by an annular push plate 224. In this respect, as shown in FIG. 24, the reinforcing bracket 88 not only closes the opening portion of the C-shaped cross sectional structure on the lower side of the vehicle, but also upwardly extends beyond the top portion of the rear pipe 204.

As shown in FIG. 25, at the position where a bolt 227 is provided for fixing the base bracket 34 of the recliner structure portion 114 on the seat cushion frame structure 104, the reinforcing bracket 88 is not formed to be a complete closed cross sectional structure, taking into consideration that a bending moment caused by the impact load acting on the rear side of the vehicle is not so large as compared to other positions in the longitudinal direction, but a slit 226 extending in the longitudinal direction is provided on the central portion of the reinforcing bracket 88 in the vertical direction, in view of the decreasing of the weight of the recliner structure portion 114.

As described above, in the side frames 140A,B of the seat cushion frame structure 104 including the oblique wires, the reinforcing bracket 88 is locally provided only on the edge portion 84 on the lower side of the side frames 140A,B with its cross sectional structure being varied in the longitudinal direction so as to prevent the buckling caused by the provision of the oblique wires, while so as to reinforce a portion where the lifter mechanism 200 is provided, and thus, the increase of the weight can be restricted, while at the same time the prevention of the bucking thereof and the reinforcing of the structure can be attained.

As described above, a risk of the bucking being generated on the lower side of the side frames 140A,B can increase due to the provision of the oblique wires 102A,B.

However, by locally reinforcing the edge portion 84 on the lower side of each of the side frames 140A,B without reinforcing the entire of the side frames 140A,B such as the uniform increase of the thickness thereof, for instance, the buckling can be effectively prevented without the increase of the weight of the side frames 140A,B by utilizing the concave portion 86 of the C-shaped open cross section around the edge portion 84 on the lower side of each of the side frames 140A,B including two C-shaped cross sectional portions and closing the C-shaped open cross sectional structure over the longitudinal direction of the side frames 140A,B by means of the reinforcing bracket 88 to form a closed cross sectional structure.

More specifically, in a case where the impact load toward the rear side of the vehicle is loaded on the vehicle, a compressive force as a component in the longitudinal direction of a tension force generated on the oblique wires 102A,B as well as a bending moment caused by such an impact load exerts on the side frames 140A,B. Since, on the lower side of the vehicle, a compressive force due to the bending moment and the compressive force related to the oblique wires 102A,B are interposed, a large compressive stress is exerted on the side frames 140A,B so that the bucking of the side frames 140A,B can be easily generated on the lower side of the vehicle.

However, since the bigger the minimum radius of gyration of area of the side frames 140A,B becomes, the higher the buckling load becomes if the length in the longitudinal direction of the side frames 140A,B is constant, the increase of the weight of the side frames 140A,B can be effectively prevented, while at the same time the buckling load can be increased by providing the closed cross sectional structure extending in the longitudinal direction around the edge portion 84 on the lower side of the side frames 140A,B to locally increase the minimum radius of gyration of area.

The inventor investigated an effect caused by a closed cross sectional structure of a pair of said frames 140A,B on a buckling caused by a tension force of the oblique wires 102A, B. More specifically, in a case where the impact load toward the rear side of the vehicle is loaded on the frame structure of the seat for the vehicle, since a component in the longitudinal direction of said tension force caused by said impact load is loaded as a compressive stress on the edge portion 84 of the lower portion of the vehicle, a high compressive stress is generated due to the fact that said component is added to a compressive stress caused by the bending moment acting on the side frames 140A,B, which causes the buckling of the side frames 140A,B.

In this respect, as to the side frames 140A,B including the cross sectional structure described in the above embodiment, the inventor investigated as to what kind of structure is effective for preventing the buckling in a case where the cross section around the edge portion 84 on the lower side of the vehicle is made closed in the longitudinal direction.

As to the buckling, the following equation under the condition a bar with an uniform cross section is modeled is known.

$$\sigma = n\pi E k^2 / L^2$$

in a case where
n: coefficient of fixity
L: length of bar
E: Young's modulus
K: minimum radius of gyration of area ($=\sqrt{(I/A)}$)
   I: minimum moment of inertia of area
   A: cross sectional area According to the above equation, if the length of the bar is constant, the larger K becomes, the higher σ becomes, so that the buckling does not easily occur. Under such a condition, if the cross sectional area is constant, in order to increase K, the minimum moment of inertia of area I only has to be increased.

In this case, as described above, since a compressive stress locally highly acts on the edge portion 84 on the lower side of the side frames 140A,B, the portion around the edge portion 84 on the lower side of the side frames 140A,B is modeled as an uniform bar.

Figure 26:
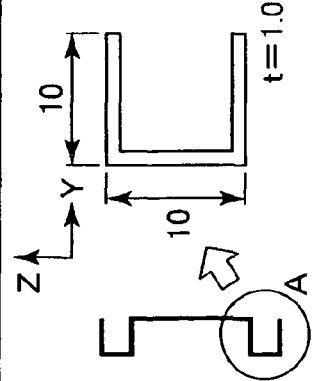
FIG. 26 is a table showing a cross sectional shape before being closed and a minimum radius of gyration of area calculated based on such a cross sectional shape.

Here, the cross sectional shape before it is closed and the minimum K calculated based on such a cross sectional shape are shown in FIG. 26.

Since the moment of inertia of area about Z-axis is 449 mm$^4$, while that about Y-axis is 283 mm$^4$, the smaller one among two moments of inertia of area is 283 mm$^4$, so that K is 3.18.

On the other hand, in a case where a C-shaped open cross section shown in FIG. 26 is reinforced by a reinforcing bracket 88 with a thickness of 1 mm and a width of 10 mm, FIG. 27 shows the most effective way of the reinforcing for securing the weight efficiency, while at the same time preventing the buckling.

In proposals 1 and 2 in FIG. 27, the reinforcing bracket 88 is disposed to be along a member with a C-shaped cross section, whereby the C-shaped cross section is still kept open, whereas, in a proposal 3, the C-shaped cross section is closed by the reinforcing bracket 88.

As shown FIG. 27, as compared to the proposals 1 and 2, in the proposal 3 in which the cross section is closed, the minimum radius of gyration of area K is large.

In particular, in a case where the cross section is reinforced so as to make the increase of the weight caused by the reinforcing constant, the smaller the difference between a radius of gyration of area about the Z-axis and that about the Y-axis becomes, the higher the weight efficiency becomes, so that it was found out that a square cross section in which the radius of gyration of area about the Z-axis and that about the Y-axis are the same is the most effective.

As described above, the preferred embodiments of the present invention were described in detail, however, it is evident that those skilled in the art could modify or change the embodiments in various manners without departing from the scope of the present invention.

For instance, in the first embodiment, with respect to the seat cushion frame structure 104, the oblique wire is provided on each side portion of the pair of the side frames 140A,B, however, it may be provided on only one side portion of the pair of the side frames 140A,B, or the endless oblique wire may be provided on one of the side portions through the pulleys, while a single oblique wire which includes a ring at each of its ends may be provided on the other of the side portions.

In addition, in the first embodiment, the seat including the oblique wire is applied to the automobile, however, it may be applied to general transportation vehicles such as railway vehicles, ships, airplanes. Further, in a case where the seat including the oblique wire is applied to the automobile, it may be applied to either a rear sheet or a front sheet, or to both sheets.

What is claimed is:

1. A seat cushion frame structure of a seat for a vehicle comprises a seat cushion frame structure a rear end of which is connected to a lower end of a seat back frame structure in such a way that the seat back frame structure can be inclined relative to the seat cushion frame structure, said seat cushion frame structure includes a pair of side frames, each of which extends in a longitudinal direction of the vehicle, and an oblique wire on at least one of said pair of side frames, an upper end of which is fixed to a side portion of said at least one of pair of side frames and a lower end of which is fixed to said seat cushion frame structure at a position forward of said upper end, said oblique wire includes a characteristic such that, in a case where a load toward a rear side of the vehicle is loaded on said seat cushion frame structure, it has a tension force exerted on said seat cushion frame structure so as to alleviate a moment acting on said seat cushion frame structure caused by said load, while it does not resist a compressive force from outside thereof wherein a reinforcing bracket which extends in the longitudinal direction of the vehicle around an edge portion on the lower side of the vehicle and tapers in such a way that its width in the vertical direction is increased as a longitudinal position approaches the rear end of the vehicle and includes a flange on its upper and lower edges, respectively, is provided on at least one of said pair of side frames on which said oblique wire is provided.

2. The seat cushion frame structure according to claim 1, wherein each of said pair of side frames includes a cross sectional shape in which a C-shaped cross section extending in the longitudinal direction of the vehicle around an edge portion on a lower side of the vehicle and a C-shaped cross section extending in the longitudinal direction of the vehicle around an edge portion on an upper side of the vehicle are combined, said reinforcing bracket is provided so as to form a closed cross sectional structure closing an opened portion of said C-shaped cross section around the edge portion on the lower side of the vehicle.

3. The seat cushion frame structure according to claim 2, wherein said closed cross sectional structure is shaped to be substantially square.

4. The seat cushion frame structure according to claim 2, wherein a width in the vertical direction of the vehicle of said closed cross sectional structure is no wider than a distance between a neutral axis with respect said bending moment caused by said oblique wire and the edge portion of the lower side of the vehicle.

5. The seat cushion frame structure according to claim 4, wherein the width of the closed cross sectional structure in the direction perpendicular to the vertical direction of the vehicle is determined by a required section modulus of said pair of side frames with respect to the bending moment about the vertical direction.

6. The seat cushion frame structure according to claim 2, wherein said seat cushion frame structure includes a lifter mechanism for upwardly and downwardly moving the seat for a vehicle, the lifter mechanism comprises a front pipe connecting front portions of said pair of side frames and extending in the widthwise direction of the vehicle perpendicular to the longitudinal direction, and a rear pipe connecting rear portions of said pair of side frames and extending in the widthwise direction of the vehicle, said front pipe is supported by the front portion of each of said pair of side frames so as to be pivoted about the widthwise direction of the vehicle, while said rear pipe is supported by the rear portion of each of said pair of side frames so as to be pivoted about the widthwise direction of the vehicle, said seat cushion frame structure further includes a parallel link mechanism connecting between the lower surface of the vehicle and the seat cushion, said parallel link mechanism includes a pair of front links, one end of each of which is supported by the lower surface of the vehicle so as to be pivoted about the widthwise direction while the other end of each of which is supported by said front pipe so as to be pivoted about the widthwise direction, and a pair of rear links, one end of each of which is supported by the lower surface of the vehicle so as to be pivoted about the widthwise direction while the other end of each of which is supported by said rear pipe so as to be pivoted about the widthwise direction, each of said pair of side frames includes a first perforated hole into which said rear pipe penetrates, said reinforcing bracket includes a second perforated hole into which said rear pipe penetrates, said second perforated hole is provided on an inner surface of the corresponding side frame so as to align with said first perforated hole, and said reinforcing bracket includes a maximum width in the vertical direction at the longitudinal position where said second perforated hole is provided.

7. The seat cushion frame structure according to claim 1, wherein each of said pair of side frames includes a C-shaped cross section extending in the longitudinal direction of the vehicle around an edge portion on a lower side of the vehicle, said reinforcing bracket is provided so as to form a closed cross sectional structure closing an opened portion of said C-shaped cross section.

8. The seat cushion frame structure according to claim 7, wherein said closed cross sectional structure is shaped to be substantially square.

9. The seat cushion frame structure according to claim 7, wherein a width in the vertical direction of the vehicle of said closed cross sectional structure is no wider than a distance between a neutral axis with respect to said bending moment caused by said oblique wire and the edge portion of the lower side of the vehicle.

10. The seat cushion frame structure according to claim 7, wherein said seat cushion frame structure includes a lifter mechanism for upwardly and downwardly moving the seat for a vehicle, the lifter mechanism comprises a front pipe connecting front portions of said pair of side frames and extending in the widthwise direction of the vehicle perpendicular to the longitudinal direction, and a rear pipe connecting rear portions of said pair of side frames and extending in the widthwise direction of the vehicle, said front pipe is supported by the front portion of each of said pair of side frames so as to be pivoted about the widthwise direction of the vehicle, while said rear pipe is supported by the rear portion of each of said pair of side frames so as to be pivoted about the widthwise direction of the vehicle, said seat cushion frame structure further includes a parallel link mechanism connecting between the lower surface of the vehicle and the seat cushion, said parallel link mechanism includes a pair of front links, one end of each of which is supported by the lower surface of the vehicle so as to be pivoted about the widthwise direction while the other end of each of which is supported by said front pipe so as to be pivoted about the widthwise direction, and a pair of rear links, one end of each of which is supported by the lower surface of the vehicle so as to be pivoted about the widthwise direction while the other end of each of which is supported by said rear pipe so as to be pivoted about the widthwise direction, each of said pair of side frames includes a first perforated hole into which said rear pipe penetrates, said reinforcing bracket includes a second perforated hole into which said rear pipe penetrates, said second perforated hole is provided on an inner surface of the corresponding side frame so as to align with said first perforated hole, and said reinforcing bracket includes a maximum width in the vertical direction at the longitudinal position where said second perforated hole is provided.

* * * * *